US011109216B2

United States Patent
Liu et al.

(10) Patent No.: US 11,109,216 B2
(45) Date of Patent: Aug. 31, 2021

(54) OPERATION OPTIMIZATION FOR TRIGGER-BASED INSTANT COMMUNICATION

(71) Applicant: Apple Inc., Cupertino, CA (US)

(72) Inventors: Yong Liu, Campbell, CA (US); Christiaan A. Hartman, Mountain View, CA (US); Lawrie Kurian, San Jose, CA (US); Tashbeeb Haque, San Francisco, CA (US)

(73) Assignee: Apple Inc., Cupertino, CA (US)

( * ) Notice: Subject to any disclaimer, the term of this patent is extended or adjusted under 35 U.S.C. 154(b) by 98 days.

(21) Appl. No.: 16/527,135

(22) Filed: Jul. 31, 2019

(65) Prior Publication Data

US 2020/0092703 A1 Mar. 19, 2020

Related U.S. Application Data

(60) Provisional application No. 62/731,686, filed on Sep. 14, 2018.

(51) Int. Cl.
*H04W 76/14* (2018.01)
*H04W 8/00* (2009.01)
*H04W 52/02* (2009.01)
*H04W 4/70* (2018.01)
*H04W 4/20* (2018.01)

(52) U.S. Cl.
CPC .............. *H04W 8/005* (2013.01); *H04W 4/20* (2013.01); *H04W 4/70* (2018.02); *H04W 52/0206* (2013.01); *H04W 76/14* (2018.02)

(58) Field of Classification Search
CPC ......... H04W 8/005; H04W 4/70; H04W 4/20; H04W 76/14; H04W 76/11; H04W 52/0206
See application file for complete search history.

(56) References Cited

U.S. PATENT DOCUMENTS

| | | | |
|---|---|---|---|
| 8,432,260 B2 | 4/2013 | Talty | |
| 9,572,063 B2 * | 2/2017 | Etemad | ............... H04L 65/4092 |
| 10,097,358 B2 | 10/2018 | Robbins | |
| 10,306,539 B2 | 5/2019 | Roberts | |
| 10,666,334 B2 * | 5/2020 | Xiong | ................... H04L 5/0048 |

(Continued)

*Primary Examiner* — Wei Zhao
(74) *Attorney, Agent, or Firm* — Kowert, Hood, Munyon, Rankin & Goetzel, P.C.

(57) ABSTRACT

One or more wireless stations operate to configure direct communication with neighboring mobile stations, e.g., direct communication between the wireless stations without utilizing an intermediate access point. A wireless station may be configured to perform a method to accelerate discovery of a peer device after an out-of-band triggering event. For example, a wireless device may detect an out-of-band triggering event and activate a wireless interface capable of peer-to-peer communications in response. The wireless device may transmit one or more discovery messages (e.g., discovery beacons, active subscribe messages, and/or unsolicited publish messages) over the wireless interface immediately after activation of the wireless interface to aid in discovery of the peer device. The one or more discovery messages may be transmitted as service discovery frames. The wireless device may perform service discovery over the wireless interface with the peer device post discovery.

20 Claims, 16 Drawing Sheets

(56) References Cited

U.S. PATENT DOCUMENTS

2009/0282130 A1 11/2009 Antoniou
2013/0016629 A1* 1/2013 Mallik ................. H04W 8/005
　　　　　　　　　　　　　　　　　　　　370/255

* cited by examiner

| Field | Size (Octets) | Description |
|---|---|---|
| FC | 2 | Frame Control field |
| Duration | 2 | Duration value for the beacon frame |
| A1 | 6 | Broadcast Address |
| A2 | 6 | Transmitter MAC address |
| A3 | 6 | Cluster ID identifying the NAN cluster |
| Seq. Ctrl | 2 | Sequence Control field |
| Time Stamp | 8 | Time Stamp of the beacon frame |
| Beacon Interval | 2 | Time units between beacons |
| Capability | 2 | Capability information field |
| NAN IE | Variable | NAN information element |
| FCS | 4 | Frame checksum |

FIG. 4A

| Field | Size | Description |
|---|---|---|
| Category | 1 | IEEE 802.11 public action frame (PAF) or protected dual of PAF |
| Action | 1 | IEEE 802.1 PAF vendor specific |
| OUI | 3 | Wi-Fi Alliance specific OUI |
| OUI Type | 1 | Identifying type and version of NAN |
| NAN attributes | Variable | One or more NAN attributes |

FIG. 4B

| Attributes | NAN SDF Frames | | | | |
|---|---|---|---|---|---|
| | Publish | | | Subscribe | Follow-up |
| | Data | Ranging | Otherwise | | |
| Master Indication | NO | NO | NO | NO | NO |
| Cluster | NO | NO | NO | NO | NO |
| Service ID List | NO | NO | NO | NO | NO |
| Service Descriptor | YES/M | YES/M | YES/M | YES/M | YES/M |
| NAN Con. Cap. | YES/O | YES/O | YES/O | YES/O | YES/O |
| WLAN Infra | YES/O | YES/O | YES/O | YES/O | YES/O |
| P2P Operation | YES/O | YES/O | YES/O | YES/O | YES/O |
| IBSS | YES/O | YES/O | YES/O | YES/O | YES/O |
| Mesh | YES/O | YES/O | YES/O | YES/O | YES/O |
| Further Service Dis | YES/O | YES/O | YES/O | YES/O | YES/O |
| Further Avail Map | YES/O | YES/O | YES/O | YES/O | YES/O |
| Country Code | YES/O | YES/O | YES/O | YES/O | YES/O |
| Ranging | YES/O | YES/O | YES/O | YES/O | YES/O |
| Cluster Discovery | NO | NO | NO | NO | NO |
| Service Desc. Ext | YES/M | YES/M | YES/O | YES/O | YES/O |
| Device Cap. | YES/M | YES/M | YES/O | YES/O | YES/O |
| NDP | NO | NO | NO | NO | NO |
| NAN Availability | YES/M | YES/M | YES/O | YES/O | YES/O |
| NDC | YES/O | YES/O | YES/O | YES/O | YES/O |
| NDL | NO | NO | NO | NO | NO |
| NDL QoS | NO | NO | NO | NO | NO |
| Unaligned Sched. | YES/O | YES/O | YES/O | YES/O | YES/O |
| Ranging Info. | NO | YES/M | NO | NO | YES/O |
| Ranging Setup | NO | NO | NO | NO | NO |
| FTM Rang. Rep. | NO | NO | NO | NO | NO |
| Element Container | YES/O | YES/O | YES/O | YES/O | YES/O |
| Ex. WLAN Infra. | YES/O | YES/O | YES/O | YES/O | YES/O |
| Ex. P2P Operation | YES/O | YES/O | YES/O | YES/O | YES/O |
| Ex. IBSS | YES/O | YES/O | YES/O | YES/O | YES/O |
| Ex. Mesh | YES/O | YES/O | YES/O | YES/O | YES/O |
| Cipher Suit Info. | YES/O | YES/O | YES/O | YES/O | YES/O |
| Security Con. Info. | YES/O | YES/O | YES/O | YES/O | YES/O |
| Shared-Key Desc. | NO | NO | NO | NO | NO |
| Public Availability | YES/O | YES/O | YES/O | YES/O | YES/O |
| Vendor Specific | YES/O | YES/O | YES/O | YES/O | YES/O |

FIG. 4C

| Field | Size | Description |
|---|---|---|
| Category | 1 | IEEE 802.11 public action frame (PAF) or protected dual of PAF |
| Action | 1 | IEEE 802.1 PAF vendor specific |
| OUI | 3 | Wi-Fi Alliance specific OUI |
| OUI Type | 1 | Identifying type and version of NAN |
| OUI Subtype | 1 | Identifying type of NAN action frame |
| Information Content | variable | Fields and/or attributes for specific NAN action frames |

*FIG. 4D*

OPERATION OPTIMIZATION FOR TRIGGER-BASED INSTANT COMMUNICATION

PRIORITY DATA

This application claims benefit of priority to U.S. Provisional Application Ser. No. 62/731,686, titled "Operation Optimization for Trigger-Based Instant Communication", filed Sep. 14, 2018, by Yong Liu, Christiaan A. Hartman, Lawrie Kurian, and Tashbeeb Haque, which is hereby incorporated by reference in its entirety as though fully and completely set forth herein.

FIELD

The present application relates to wireless communications, including techniques for wireless communication among wireless stations in a wireless networking system.

DESCRIPTION OF THE RELATED ART

Wireless communication systems are rapidly growing in usage. Further, wireless communication technology has evolved from voice-only communications to also include the transmission of data, such as Internet and multimedia content. A popular short/intermediate range wireless communication standard is wireless local area network (WLAN). Most modern WLANs are based on the IEEE 802.11 standard (or 802.11, for short) and are marketed under the Wi-Fi brand name. WLAN networks link one or more devices to a wireless access point, which in turn provides connectivity to the wider area Internet.

In 802.11 systems, devices that wirelessly connect to each other are referred to as "stations", "mobile stations", "user devices" or STA or UE for short. Wireless stations can be either wireless access points or wireless clients (or mobile stations). Access points (APs), which are also referred to as wireless routers, act as base stations for the wireless network. APs transmit and receive radio frequency signals for communication with wireless client devices. APs can also typically couple to the Internet in a wired fashion. Wireless clients operating on an 802.11 network can be any of various devices such as laptops, tablet devices, smart phones, or fixed devices such as desktop computers. Wireless client devices are referred to herein as user equipment (or UE for short). Some wireless client devices are also collectively referred to herein as mobile devices or mobile stations (although, as noted above, wireless client devices overall may be stationary devices as well).

In some prior art systems, Wi-Fi mobile stations are able to communicate directly with each other without using an intermediate access point. However, improvements in the operation of such devices are desired, such as in setup and coordination of the communication between such devices.

SUMMARY

Some embodiments described herein relate to systems and methods for peer wireless stations (e.g., wireless stations configured to communicate with neighboring wireless stations without utilizing an intermediate access point) to accelerate discovery of one another after an out-of-band triggering of service discovery.

Some embodiments relate to a wireless station that includes one or more antennas, one or more radios, and one or more processors coupled (directly or indirectly) to the radios. At least one radio is configured to perform Wi-Fi communications, e.g., via a Wi-Fi interface. The wireless station may perform voice and/or data communications, as well as any or all of the methods described herein.

In some embodiments, one or more wireless stations operate to configure direct communication with neighboring mobile stations, e.g., direct communication between the wireless stations without utilizing an intermediate access point. Embodiments of the disclosure relate to a mechanism for peer devices to accelerate discovery of one another (e.g., as compared to typical discovery processes) after an out-of-band triggering of service discovery.

In some embodiments, the communications may be performed via a peer-to-peer wireless communications protocol such as Neighbor Awareness Networking (NAN). Thus, embodiments of the disclosure also relate to NAN devices accelerating discovery of one another after an out-of-band triggering of NAN service discovery (e.g., as compared to typical NAN service discovery processes after triggering).

In some embodiments, a wireless station may be configured to perform a method to accelerate discovery of a peer device after an out-of-band triggering event. For example, in some embodiments, a wireless device may detect an out-of-band triggering event and activate a wireless interface capable of peer-to-peer communications in response. The wireless device may transmit one or more discovery messages (e.g., discovery beacons, active subscribe messages, and/or unsolicited publish messages) over the wireless interface substantially immediately after activation of the wireless interface to aid in discovery of the peer device. The one or more discovery messages may be transmitted as service discovery frames. The wireless device may perform service discovery over the wireless interface with the peer device post discovery.

As another example, in some embodiments, a wireless device may detect an out-of-band trigger event and activate a wireless interface capable of peer-to-peer communications in response. The wireless device may tune the wireless interface to a first discovery channel and perform, on the first discovery channel, accelerated service discovery with the pee device over the wireless interface. The first discovery channel may be selected based, at least in part, on information exchanged during the out-of-band triggering event and/or based on limitations or requirements of the wireless device and/or peer wireless device.

This Summary is intended to provide a brief overview of some of the subject matter described in this document. Accordingly, it will be appreciated that the above-described features are only examples and should not be construed to narrow the scope or spirit of the subject matter described herein in any way. Other features, aspects, and advantages of the subject matter described herein will become apparent from the following Detailed Description, Figures, and Claims.

BRIEF DESCRIPTION OF THE DRAWINGS

A better understanding of the present subject matter can be obtained when the following detailed description of the embodiments is considered in conjunction with the following drawings.

FIG. 4A illustrates an example format of a synchronization/discovery beacon frame, according to some embodiments.

FIG. 4B illustrates an example format of a service discovery frame (SDF), according to some embodiments.

FIG. 4C illustrates an example format of a NAN attribute field, according to some embodiments.

FIG. 4D illustrates an example format of an action frame, according to some embodiments.

Figure 1:
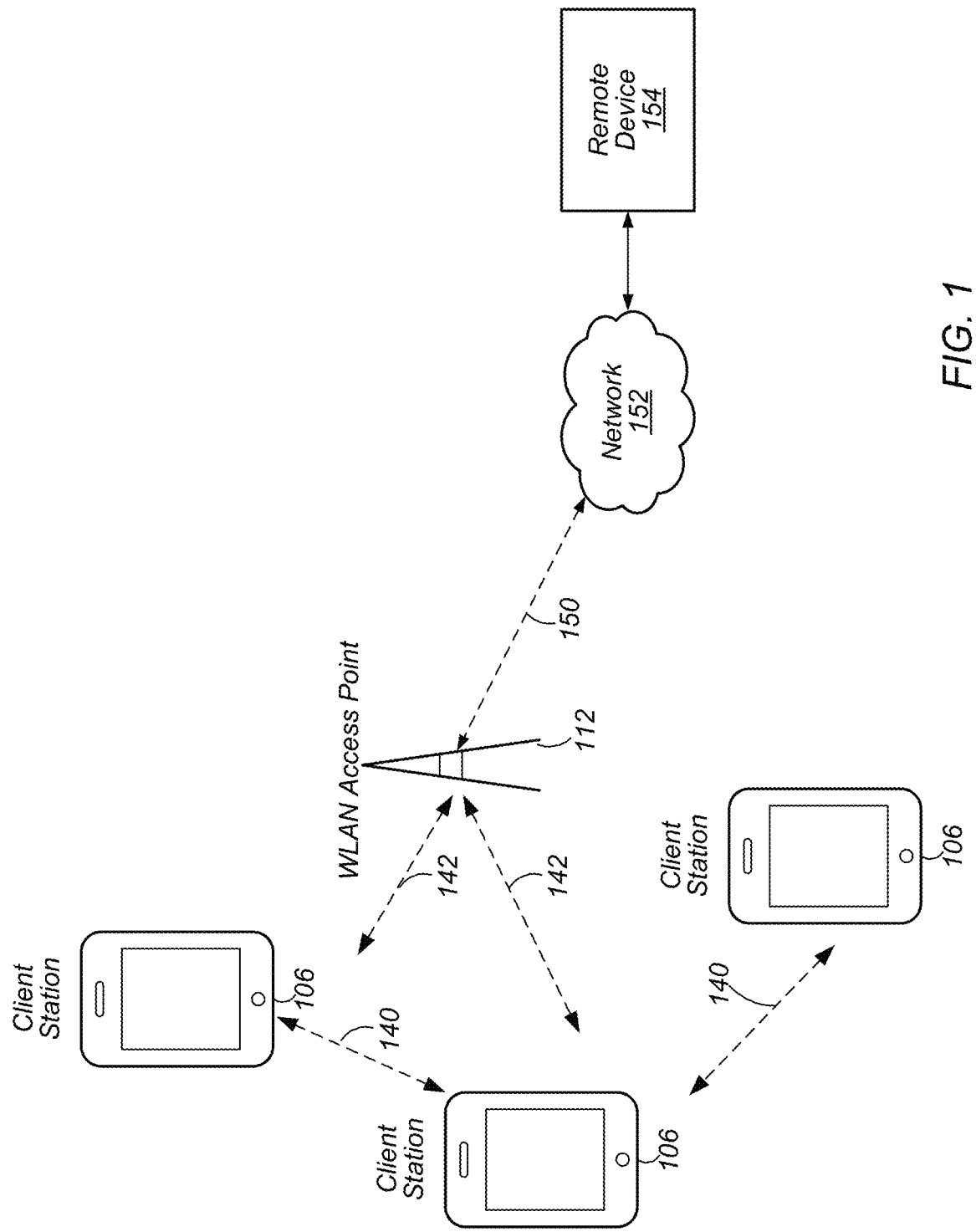
FIG. 1 illustrates an example WLAN communication system, according to some embodiments.

While the features described herein are susceptible to various modifications and alternative forms, specific embodiments thereof are shown by way of example in the drawings and are herein described in detail. It should be understood, however, that the drawings and detailed description thereto are not intended to be limiting to the particular form disclosed, but on the contrary, the intention is to cover all modifications, equivalents and alternatives falling within the spirit and scope of the subject matter as defined by the appended claims.

DETAILED DESCRIPTION

Acronyms

Various acronyms are used throughout the present application. Definitions of the most prominently used acronyms that may appear throughout the present application are provided below:

UE: User Equipment
AP: Access Point
DL: Downlink (from BS to UE)
UL: Uplink (from UE to BS)
TX: Transmission/Transmit
RX: Reception/Receive
LAN: Local Area Network
WLAN: Wireless LAN
RAT: Radio Access Technology
DW: Discovery Window
NW: Negotiation Window
FAW: Further Availability Window
SID: Service ID
SInf: Service Information
Sinf-Seg: Service Information Segment
NW-Req: to request the peer NAN device to present in NW
CaOp: Capabilities and Operations elements
Security: Security preferences
SessionInfo: advertisement_id, session_mac, session_id, port, proto
ChList: preferred datapath channels
AM: anchor master
DW: discovery window
HCFR: hop count from remote devices
NAN: neighbor awareness network
SDA: service descriptor attribute
SDF: service discovery frame
SRF: service response filter
TSF: time synchronization function Terminology The following is a glossary of terms used in this disclosure:

Memory Medium—Any of various types of non-transitory memory devices or storage devices. The term "memory medium" is intended to include an installation medium, e.g., a CD-ROM, floppy disks, or tape device; a computer system memory or random-access memory such as DRAM, DDR RAM, SRAM, EDO RAM, Rambus RAM, etc.; a non-volatile memory such as a Flash, magnetic media, e.g., a hard drive, or optical storage; registers, or other similar types of memory elements, etc. The memory medium may include other types of non-transitory memory as well or combinations thereof. In addition, the memory medium may be located in a first computer system in which the programs are executed, or may be located in a second different computer system which connects to the first computer system over a network, such as the Internet. In the latter instance, the second computer system may provide program instructions to the first computer for execution. The term "memory medium" may include two or more memory mediums which may reside in different locations, e.g., in different computer systems that are connected over a network. The memory medium may store program instructions (e.g., embodied as computer programs) that may be executed by one or more processors.

Carrier Medium—a memory medium as described above, as well as a physical transmission medium, such as a bus, network, and/or other physical transmission medium that conveys signals such as electrical, electromagnetic, or digital signals.

Computer System—any of various types of computing or processing systems, including a personal computer system (PC), mainframe computer system, workstation, network appliance, Internet appliance, personal digital assistant (PDA), television system, grid computing system, or other device or combinations of devices. In general, the term "computer system" can be broadly defined to encompass any device (or combination of devices) having at least one processor that executes instructions from a memory medium.

Mobile Device (or Mobile Station)—any of various types of computer systems devices which are mobile or portable and which performs wireless communications using WLAN communication. Examples of mobile devices include mobile telephones or smart phones (e.g., iPhone™, Android™-based phones), and tablet computers such as iPad™, Samsung Galaxy™, etc. Various other types of devices would fall into this category if they include Wi-Fi or both cellular and Wi-Fi communication capabilities, such as laptop computers (e.g., MacBook™) portable gaming devices (e.g., Nintendo DS™, PlayStation Portable™, Gameboy Advance™, iPhone™), portable Internet devices, and other handheld devices, as well as wearable devices such as smart watches, smart glasses, headphones, pendants, earpieces, etc. In general, the term "mobile device" can be broadly defined to encompass any electronic, computing, and/or telecommunications device (or combination of devices) which is easily transported by a user and capable of wireless communication using WLAN or Wi-Fi.

Wireless Device (or Wireless Station)—any of various types of computer systems devices which performs wireless communications using WLAN communications. As used herein, the term "wireless device" may refer to a mobile device, as defined above, or to a stationary device, such as a stationary wireless client or a wireless base station. For example, a wireless device may be any type of wireless station of an 802.11 system, such as an access point (AP) or a client station (STA or UE). Further examples include televisions, media players (e.g., AppleTV™, Roku™, Amazon FireTV™, Google Chromecast™, etc.), refrigerators, laundry machines, thermostats, and so forth.

WLAN—The term "WLAN" has the full breadth of its ordinary meaning, and at least includes a wireless communication network or RAT that is serviced by WLAN access points and which provides connectivity through these access points to the Internet. Most modern WLANs are based on IEEE 802.11 standards and are marketed under the name "Wi-Fi". A WLAN network is different from a cellular network.

Processing Element—refers to various implementations of digital circuitry that perform a function in a computer system. Additionally, processing element may refer to various implementations of analog or mixed-signal (combination of analog and digital) circuitry that perform a function (or functions) in a computer or computer system. Processing elements include, for example, circuits such as an integrated circuit (IC), ASIC (Application Specific Integrated Circuit), portions or circuits of individual processor cores, entire processor cores, individual processors, programmable hardware devices such as a field programmable gate array (FPGA), and/or larger portions of systems that include multiple processors.

NAN data link (NDL)—refers to a communication link between peer wireless stations (e.g., peer NAN devices). Note that the peer devices may be in a common (e.g., same) NAN cluster. In addition, a NAN data link may support one or more NAN datapaths between peer wireless stations. Note further that a NAN data link may only belong to a single NAN data cluster.

NAN datapath (NDP)—refers to a communication link between peer wireless stations that supports a service. Note that one or more NAN datapaths may be supported by a NAN data link. Additionally, note that a NAN datapath supports a service between wireless stations. Typically, one of the peer wireless stations will be a publisher of the service and the other peer wireless station will be a subscriber to the service.

NAN cluster—refers to multiple peer wireless stations linked via synchronization to a common time source (e.g., a common NAN clock). Note that a peer wireless station may be a member of more than one NAN cluster.

NAN data cluster (NDC)—refers to a set of peer wireless stations in a common (e.g., same) NAN cluster that share a common base schedule (e.g., a NAN data cluster base schedule). In addition, peer wireless stations in a NAN data cluster may share at least one NAN data link that includes an active datapath with another member wireless station within the NAN data cluster.

Note that a peer wireless station may be a member of more than one NAN cluster; however, as noted previously, a NAN data link belongs to exactly one NAN data cluster. Note further, that in a NAN data cluster, all member peer wireless stations may maintain tight synchronization (e.g., via a NAN data cluster base schedule) amongst each other and may be present at a common (e.g., same) further availability slot(s) (or window(s)) as indicated by a NAN data cluster base schedule. In addition, each NAN data link may have its own NAN data link schedule and the NAN data link schedule may be a superset of a NAN data cluster base schedule.

WI-FI—The term "WI-FI" has the full breadth of its ordinary meaning, and at least includes a wireless communication network or RAT that is serviced by wireless LAN (WLAN) access points and which provides connectivity through these access points to the Internet. Most modern Wi-Fi networks (or WLAN networks) are based on IEEE 802.11 standards and are marketed under the name "WI-FI". A WI-FI (WLAN) network is different from a cellular network.

BLUETOOTH™—The term "BLUETOOTH™" has the full breadth of its ordinary meaning, and at least includes any of the various implementations of the Bluetooth standard, including Bluetooth Low Energy (BTLE) and Bluetooth Low Energy for Audio (BTLEA), including future implementations of the Bluetooth standard, among others.

Personal Area Network—The term "Personal Area Network" has the full breadth of its ordinary meaning, and at least includes any of various types of computer networks used for data transmission among devices such as computers, phones, tablets and input/output devices. Bluetooth is one example of a personal area network. A PAN is an example of a short-range wireless communication technology.

Automatically—refers to an action or operation performed by a computer system (e.g., software executed by the computer system) or device (e.g., circuitry, programmable hardware elements, ASICs, etc.), without user input directly specifying or performing the action or operation. Thus, the term "automatically" is in contrast to an operation being manually performed or specified by the user, where the user provides input to directly perform the operation. An automatic procedure may be initiated by input provided by the user, but the subsequent actions that are performed "automatically" are not specified by the user, e.g., are not performed "manually", where the user specifies each action to perform. For example, a user filling out an electronic form by selecting each field and providing input specifying information (e.g., by typing information, selecting check boxes, radio selections, etc.) is filling out the form manually, even though the computer system must update the form in response to the user actions. The form may be automatically filled out by the computer system where the computer system (e.g., software executing on the computer system) analyzes the fields of the form and fills in the form without any user input specifying the answers to the fields. As indicated above, the user may invoke the automatic filling of the form, but is not involved in the actual filling of the form (e.g., the user is not manually specifying answers to fields but rather they are being automatically completed). The present specification provides various examples of operations being automatically performed in response to actions the user has taken.

Concurrent—refers to parallel execution or performance, where tasks, processes, signaling, messaging, or programs are performed in an at least partially overlapping manner.

For example, concurrency may be implemented using "strong" or strict parallelism, where tasks are performed (at least partially) in parallel on respective computational elements, or using "weak parallelism", where the tasks are performed in an interleaved manner, e.g., by time multiplexing of execution threads.

Configured to—Various components may be described as "configured to" perform a task or tasks. In such contexts, "configured to" is a broad recitation generally meaning "having structure that" performs the task or tasks during operation. As such, the component can be configured to perform the task even when the component is not currently performing that task (e.g., a set of electrical conductors may be configured to electrically connect a module to another module, even when the two modules are not connected). In some contexts, "configured to" may be a broad recitation of structure generally meaning "having circuitry that" performs the task or tasks during operation. As such, the component can be configured to perform the task even when the component is not currently on. In general, the circuitry that forms the structure corresponding to "configured to" may include hardware circuits.

Various components may be described as performing a task or tasks, for convenience in the description. Such descriptions should be interpreted as including the phrase "configured to." Reciting a component that is configured to perform one or more tasks is expressly intended not to invoke 35 U.S.C. § 112(f) interpretation for that component.

The headings used herein are for organizational purposes only and are not meant to be used to limit the scope of the description. As used throughout this application, the word "may" is used in a permissive sense (e.g., meaning having the potential to), rather than the mandatory sense (e.g., meaning must). The words "include," "including," and "includes" indicate open-ended relationships and therefore mean including, but not limited to. Similarly, the words "have," "having," and "has" also indicate open-ended relationships, and thus mean having, but not limited to. The terms "first," "second," "third," and so forth as used herein are used as labels for nouns that they precede, and do not imply any type of ordering (e.g., spatial, temporal, logical, etc.) unless such an ordering is otherwise explicitly indicated. For example, a "third component electrically connected to the module substrate" does not preclude scenarios in which a "fourth component electrically connected to the module substrate" is connected prior to the third component, unless otherwise specified. Similarly, a "second" feature does not require that a "first" feature be implemented prior to the "second" feature, unless otherwise specified.

FIG. 1—WLAN System

FIG. 1 illustrates an example WLAN system according to some embodiments. As shown, the exemplary WLAN system includes a plurality of wireless client stations or devices, or user equipment (UEs), 106 that are configured to communicate over a wireless communication channel 142 with an Access Point (AP) 112. The AP 112 may be a Wi-Fi access point. The AP 112 may communicate via a wired and/or a wireless communication channel 150 with one or more other electronic devices (not shown) and/or another network 152, such as the Internet. Additional electronic devices, such as the remote device 154, may communicate with components of the WLAN system via the network 152. For example, the remote device 154 may be another wireless client station. The WLAN system may be configured to operate according to any of various communications standards, such as the various IEEE 802.11 standards. In some embodiments, at least one wireless device 106 is configured to communicate directly with one or more neighboring mobile devices (e.g., via direct communication channels 140), without use of the access point 112.

In some embodiments, as further described below, a wireless device 106 may be configured to perform methods to detect an out-of-band triggering event and activate a wireless interface capable of peer-to-peer communications in response. The wireless device 106 may transmit one or more discovery messages (e.g., discovery beacons, active subscribe messages, and/or unsolicited publish messages) over the wireless interface substantially immediately after activation of the wireless interface to aid in discovery of the peer device. The one or more discovery messages may be transmitted as service discovery frames. The wireless device 106 may perform service discovery over the wireless interface with the peer device post discovery.

In some embodiments, the wireless device 106 may detect an out-of-band trigger event and activate a wireless interface capable of peer-to-peer communications in response. The wireless device 106 may tune the wireless interface to a first discovery channel and perform, on the first discovery channel, accelerated service discovery with the pee device over the wireless interface. The first discovery channel may be selected based, at least in part, on information exchanged during the out-of-band triggering event and/or based on limitations or requirements of the wireless device 106 and/or peer wireless device 106.

Figure 2:
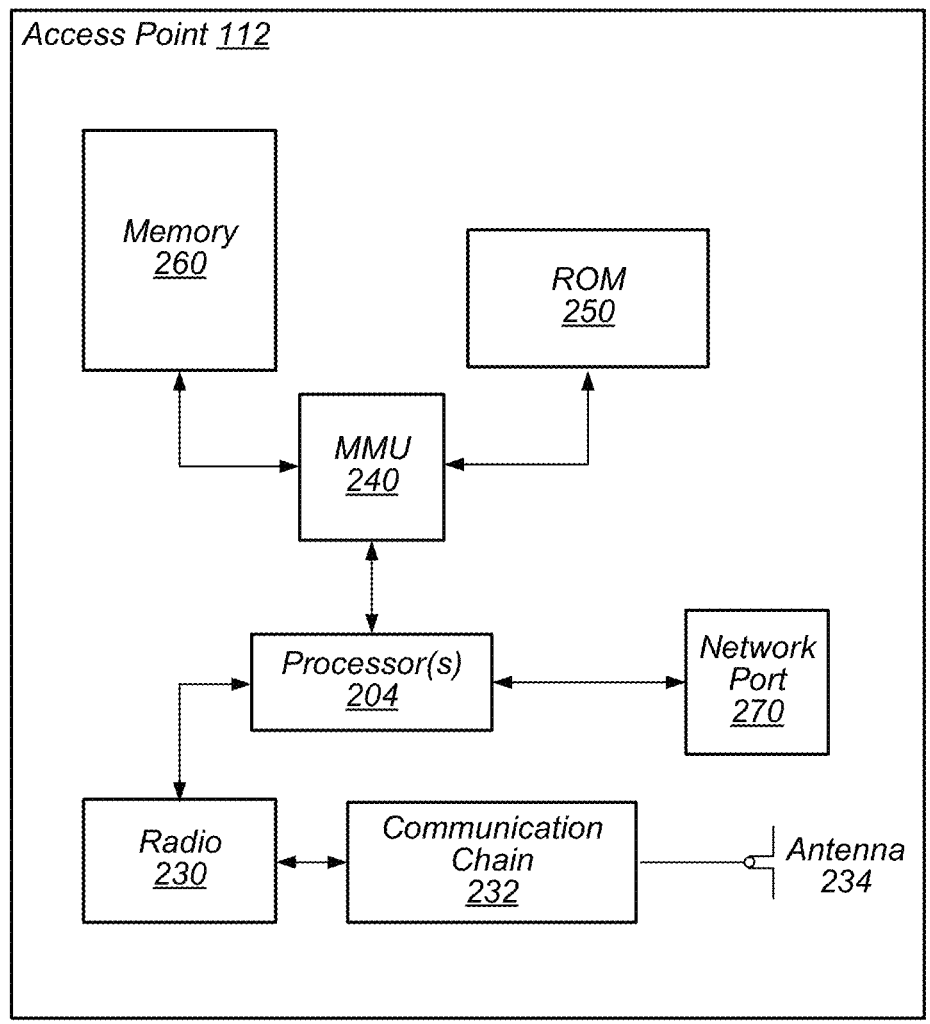
FIG. 2 illustrates an example simplified block diagram of a WLAN Access Point (AP), according to some embodiments.

FIG. 2—Access Point Block Diagram

FIG. 2 illustrates an exemplary block diagram of an access point (AP) 112. It is noted that the block diagram of the AP of FIG. 2 is only one example of a possible system. As shown, the AP 112 may include processor(s) 204 which may execute program instructions for the AP 112. The processor(s) 204 may also be coupled (directly or indirectly) to memory management unit (MMU) 240, which may be configured to receive addresses from the processor(s) 204 and to translate those addresses to locations in memory (e.g., memory 260 and read only memory (ROM) 250) or to other circuits or devices.

The AP 112 may include at least one network port 270. The network port 270 may be configured to couple to a wired network and provide a plurality of devices, such as mobile devices 106, access to the Internet. For example, the network port 270 (or an additional network port) may be configured to couple to a local network, such as a home network or an enterprise network. For example, port 270 may be an Ethernet port. The local network may provide connectivity to additional networks, such as the Internet.

The AP 112 may include at least one antenna 234, which may be configured to operate as a wireless transceiver and may be further configured to communicate with mobile device 106 via wireless communication circuitry 230. The antenna 234 communicates with the wireless communication circuitry 230 via communication chain 232. Communication chain 232 may include one or more receive chains, one or more transmit chains or both. The wireless communication circuitry 230 may be configured to communicate via Wi-Fi or WLAN, e.g., 802.11. The wireless communication circuitry 230 may also, or alternatively, be configured to communicate via various other wireless communication technologies, including, but not limited to, Long-Term Evolution (LTE), LTE Advanced (LTE-A), Global System for Mobile (GSM), Wideband Code Division Multiple Access (WCDMA), CDMA2000, etc., for example when the AP is co-located with a base station in case of a small cell, or in other instances when it may be desirable for the AP 112 to communicate via various different wireless communication technologies.

In some embodiments, as further described below, AP 112 may be configured to perform methods to detect an out-of-band triggering event and activate a wireless interface capable of peer-to-peer communications in response. The AP 112 may transmit one or more discovery messages (e.g., discovery beacons, active subscribe messages, and/or unsolicited publish messages) over the wireless interface substantially immediately after activation of the wireless interface to aid in discovery of the peer device. The one or more discovery messages may be transmitted as service discovery frames. The AP 112 may perform service discovery over the wireless interface with the peer device post discovery.

In some embodiments, the AP 112 may detect an out-of-band trigger event and activate a wireless interface capable of peer-to-peer communications in response. The AP 112 may tune the wireless interface to a first discovery channel and perform, on the first discovery channel, accelerated service discovery with the pee device over the wireless interface. The first discovery channel may be selected based, at least in part, on information exchanged during the out-of-band triggering event and/or based on limitations or requirements of the AP 112 and/or peer AP 112.

Figure 3:
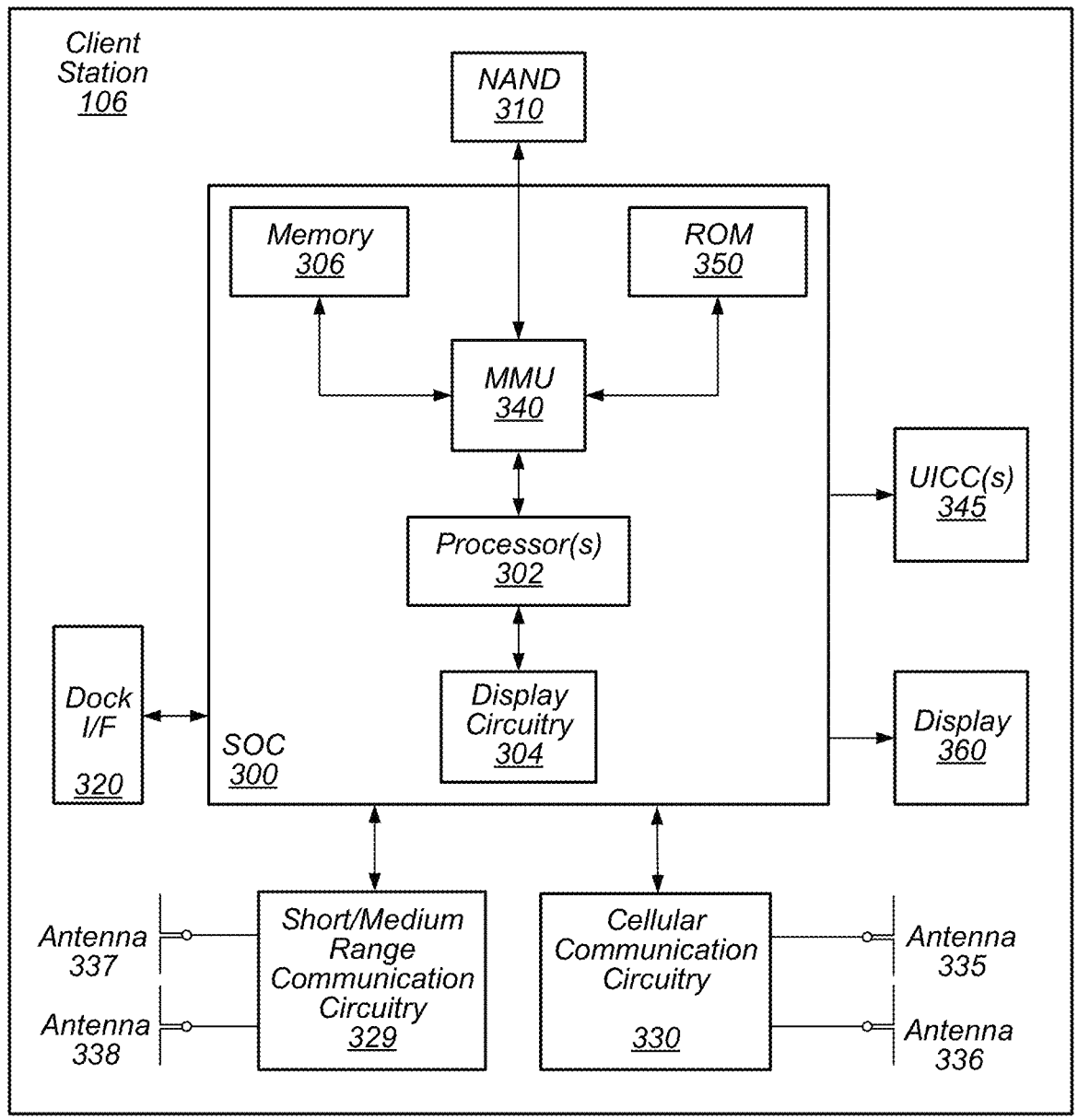
FIG. 3 illustrates an example simplified block diagram of a mobile station (UE), according to some embodiments.

FIG. 3—Client Station Block Diagram

FIG. 3 illustrates an example simplified block diagram of a client station 106. It is noted that the block diagram of the client station of FIG. 3 is only one example of a possible client station. According to embodiments, client station 106 may be a user equipment (UE) device, a mobile device or mobile station, and/or a wireless device or wireless station. As shown, the client station 106 may include a system on chip (SOC) 300, which may include portions for various purposes. The SOC 300 may be coupled to various other circuits of the client station 106. For example, the client station 106 may include various types of memory (e.g., including NAND flash 310), a connector interface (I/F) (or dock) 320 (e.g., for coupling to a computer system, dock, charging station, etc.), the display 360, cellular communication circuitry 330 such as for LTE, GSM, etc., and short to medium range wireless communication circuitry 329 (e.g., Bluetooth™ and WLAN circuitry). The client station 106 may further include one or more smart cards 310 that incorporate SIM (Subscriber Identity Module) functionality, such as one or more UICC(s) (Universal Integrated Circuit Card(s)) cards 345. The cellular communication circuitry 330 may couple to one or more antennas, such as antennas 335 and 336 as shown. The short to medium range wireless communication circuitry 329 may also couple to one or more antennas, such as antennas 337 and 338 as shown. Alternatively, the short to medium range wireless communication circuitry 329 may couple to the antennas 335 and 336 in addition to, or instead of, coupling to the antennas 337 and 338. The short to medium range wireless communication circuitry 329 may include multiple receive chains and/or multiple transmit chains for receiving and/or transmitting multiple spatial streams, such as in a multiple-input multiple output (MIMO) configuration.

As shown, the SOC 300 may include processor(s) 302, which may execute program instructions for the client station 106 and display circuitry 304, which may perform graphics processing and provide display signals to the display 360. The processor(s) 302 may also be coupled to memory management unit (MMU) 340, which may be configured to receive addresses from the processor(s) 302 and translate those addresses to locations in memory (e.g., memory 306, read only memory (ROM) 350, NAND flash memory 310) and/or to other circuits or devices, such as the display circuitry 304, cellular communication circuitry 330, short to medium range wireless communication circuitry 329, connector interface (I/F) 320, and/or display 360. The MMU 340 may be configured to perform memory protection and page table translation or set up. In some embodiments, the MMU 340 may be included as a portion of the processor(s) 302.

As noted above, the client station 106 may be configured to communicate wirelessly directly with one or more neighboring client stations. The client station 106 may be configured to communicate according to a WLAN RAT for communication in a WLAN network, such as that shown in FIG. 1. Further, in some embodiments, as further described below, client station 106 may be configured to perform methods to detect an out-of-band triggering event and activate a wireless interface capable of peer-to-peer communications in response. The client station 106 may transmit one or more discovery messages (e.g., discovery beacons, active subscribe messages, and/or unsolicited publish messages) over the wireless interface substantially immediately after activation of the wireless interface to aid in discovery of the peer device. The one or more discovery messages may be transmitted as service discovery frames. The client station 106 may perform service discovery over the wireless interface with the peer device post discovery.

In some embodiments, the client station 106 may detect an out-of-band trigger event and activate a wireless interface capable of peer-to-peer communications in response. The client station 106 may tune the wireless interface to a first discovery channel and perform, on the first discovery channel, accelerated service discovery with the pee device over the wireless interface. The first discovery channel may be selected based, at least in part, on information exchanged during the out-of-band triggering event and/or based on limitations or requirements of the client station 106 and/or peer client station 106.

As described herein, the client station 106 may include hardware and software components for implementing the features described herein. For example, the processor 302 of the client station 106 may be configured to implement part or all of the features described herein, e.g., by executing program instructions stored on a memory medium (e.g., a non-transitory computer-readable memory medium). Alternatively (or in addition), processor 302 may be configured as a programmable hardware element, such as an FPGA (Field Programmable Gate Array), or as an ASIC (Application Specific Integrated Circuit). Alternatively (or in addition) the processor 302 of the UE 106, in conjunction with one or more of the other components 300, 304, 306, 310, 320, 330, 335, 340, 345, 350, 360 may be configured to implement part or all of the features described herein.

In addition, as described herein, processor 302 may include one or more processing elements. Thus, processor 302 may include one or more integrated circuits (ICs) that are configured to perform the functions of processor 302. In addition, each integrated circuit may include circuitry (e.g., first circuitry, second circuitry, etc.) configured to perform the functions of processor(s) 204.

Further, as described herein, cellular communication circuitry 330 and short-range wireless communication circuitry 329 may each include one or more processing elements. In other words, one or more processing elements may be included in cellular communication circuitry 330 and also in short to medium range wireless communication circuitry 329. Thus, each of cellular communication circuitry 330 and short-range wireless communication circuitry 329 may include one or more integrated circuits (ICs) that are configured to perform the functions of cellular communication circuitry 330 and short-range wireless communication circuitry 329, respectively. In addition, each integrated circuit may include circuitry (e.g., first circuitry, second circuitry, etc.) configured to perform the functions of cellular communication circuitry 330 and short-range wireless communication circuitry 329.

Peer-to-Peer Frame Formats

In some embodiments, Wi-Fi devices (e.g., client station 106) may be able to communicate with each other in a peer to peer manner, e.g., without the communications going through an intervening access point. In some embodiments, devices may exchange one or more management frames, e.g., such as synchronization/discovery beacon frames, service discovery frames (SDFs), and/or action frames, in order to synchronize, advertise, solicit, and/or negotiate a peer-to-peer data session, such as a NAN datapath and/or a NAN datalink. In some embodiments, particular management frame formats (e.g., synchronization/discovery beacon frame formats, SDF formats, and/or action frame formats) may be implemented to transport information associated with embodiments disclosed herein.

For example, as illustrated by FIG. 4A, a synchronization/discovery beacon frame format (e.g., as specified by NAN 2.0 and later versions of NAN) may include fields such as a frame control (FC) filed, a duration field, multiple address fields (e.g., A1-A3), a sequence control field, a time stamp field, a beacon interval field, a capability information field, a NAN information element (IE) field, and/or a frame checksum (FCS) field. The frame control field, duration field, sequence control field, time stamp field, beacon interval field, capability field, and FCS field may be defined by IEEE 802.11. Note that for synchronization beacons, the beacon interval field may be set to 512 TUs, which may correspond to a time interval between consecutive starts of discovery windows. In addition, for discovery beacons, the beacon interval field may be set to 100 TUs, which may correspond to an average time between consecutive discovery beacon transmissions by a device in a master role. Addresses may include a broadcast address (A1), a transmitter medium access control (MAC) address (A2), and a cluster identifier address (A3). In some embodiments, the NAN IE may be vendor specific and may be configured to transport information associated with embodiments disclosed herein.

As another example, as illustrated by FIG. 4B, a service discovery frame format (e.g., as specified by NAN 2.0 and later versions of NAN) may include one or more fields, including a category field, an action field, an organizationally unique identifier (OUI) field, an OUI type field, and/or a NAN attributes field. In some embodiments, information associated with embodiments disclosed herein may be transported via the NAN attributes field. In some embodiments, information associated with embodiments disclosed herein may be transported via the OUI field and/or the OUI type field.

Further, as illustrated by FIG. 4C, the NAN attribute field (e.g., as specified by NAN 2.0 and later versions of NAN) includes multiple fields that may be used to implement features of embodiments disclosed herein. For example, in some embodiments, information associated with embodiments disclosed herein may be transported via any of (or any combination of) attributes included in the NAN attribute field. For example, in some embodiments, the vendor specific attribute may be used to transport information associated with embodiments disclosed herein. As another example, the further availability map attribute may be used to transport information associated with embodiments disclosed herein. As shown, the NAN attribute field may contain (or included) different attributes based on a type of NAN SDF frame. For example, a publish SDF frame for data transmission may include both mandatory (M) and optional (O) attributes that differ from a publish SDF frame for ranging and/or other purposes (e.g., "Otherwise"). Similarly, a subscribe SDF frame may include differing attributes as compared to a follow-up SDF and/or the various publish SDF frames. Thus, as a further example, various configurations of a NAN attribute may be used to transport information associated with embodiments disclosed herein.

As yet a further example, as illustrated by FIG. 4D, an action frame format (e.g., as specified by NAN 2.0 and later versions of NAN) may include one or more fields, including a category field, an action field, an OUI field, an OUI type field, an OUI subtype field and/or an information content field. In some embodiments, information associated with embodiments disclosed herein may be transported via the information content field. In some embodiments, information associated with embodiments disclosed herein may be transported via the OUI field, the OUI type field, and/or the OUI subtype field.

Wi-Fi Peer to Peer Communication Protocols

In some embodiments, Wi-Fi devices (e.g., client station 106) may be able to communicate with each other in a peer to peer manner, e.g., without the communications going through an intervening access point. There are currently two types of Wi-Fi peer to peer networking protocols in the Wi-Fi Alliance. In one type of peer to peer protocol, when two Wi-Fi devices (e.g., wireless stations) communicate with each other, one of the Wi-Fi devices essentially acts as a pseudo access point and the other acts as a client device. In a second type of Wi-Fi peer to peer protocol, referred to as a neighbor awareness networking (NAN), the two Wi-Fi client devices (wireless stations) act as similar peer devices in communicating with each other, e.g., neither one behaves as an access point.

In a NAN system, each wireless station may implement methods to ensure that it is synchronized with a neighboring wireless station to which it is communicating. Further, a wireless station may negotiate a common discovery window for exchange of synchronization packets to help ensure the devices that are communicating directly with each other are properly synchronized to enable the communication. Once two wireless stations have the same discovery window, they may exchange synchronization packets to stay synchronized with each other. The wireless stations may also use the discovery window to exchange service discovery frames to convey other information such as further availability beyond discovery windows.

The NAN protocol initially included two aspects: 1) synchronization and discovery (NAN 1.0) and 2) datapath transmission (NAN 2.0). NAN 1.0 describes methods for NAN protocol synchronization and discovery. After two wireless stations have discovered each other (per NAN 1.0) they may implement a procedure to setup a NAN datapath between them so that they can properly communicate. After this, per NAN 2.0, the two wireless stations arrange for a common datapath negotiation window so that they can negotiate capabilities, synchronization requirements, and exchange further service information. The datapath negotiation window is a time window that enables two wireless stations to communicate with each other so that they can negotiate these capabilities and synchronization requirements and exchange this further service information. Once the datapath negotiation window has been established and NAN datapath setup has been performed, the wireless stations may perform datapath synchronization to help ensure that the two stations stay synchronized with each other for proper communication. Additionally, datapath resource allocation relates to two peer wireless stations communicating with each other regarding a common time slot and channel for communication. In other words, the two devices communicate with each other regarding which channel they should use and at which time slot, to help ensure proper communication between them. In addition, the two devices communicate with each other regarding which channel and time slot each would prefer to use for future communications between the devices.

NAN 3.0 introduces TCP/IP support for NAN as well as out-of-band (e.g., Bluetooth and/or Bluetooth Low Energy) triggering of NAN discovery. In particular, NAN 3.0 will introduce support of NAN service discovery over lower energy wireless interfaces. Thus, wireless stations will be enabled to advertise and/or seek NAN services over the lower energy wireless interfaces. NAN 4.0 will further introduce near field communication (NFC) triggering for NAN. Embodiments described herein further define methods (and/or mechanisms) for a wireless station (including, but not limited to, a NAN device) to accelerate service discovery and data path communication post out-of-band triggering. In other words, service discovery (e.g., NAN service discovery) and data path communication may be accelerated based on a triggering of the service discovery over a lower power interface such as Bluetooth, Bluetooth Low Energy (BLE), NFC, and so forth, or a triggering of the service discovery from a user intervention such as QR code scanning, user selection, and so forth.

Peer-to-Peer Trigger Based Instant Communications

Existing implementations of NAN (e.g., NAN 1.0 and/or NAN 2.0) enable many device-to-device (or peer-to-peer) direct communication applications, some of which may rely on Wi-Fi/NAN background discovery and some of which may rely on an out-of-band (OOB) trigger prior to enabling (or initiating) NAN discovery. OOB triggers may include Bluetooth triggering, Bluetooth Low Energy (BLE) triggering, NFC triggering, quick response (QR) code scanning, user intervention, and so forth. In addition, in order to provide an optimal user experience, many trigger-based device-to-device (D2D) applications require low (or very low) latency data transmissions. In other words, many D2D applications may require instant (or nearly instant as observed by a user) communication after triggering, e.g., a "tap-and-go" user experience. Note that a "tap-and-go" user experiences may imply an application (e.g., such as a NAN application) needing to complete an entire transaction within approximately one to two seconds, including triggering (e.g., after an NFC trigger or other OOB triggering mechanism). However, current NAN implementations (e.g., current protocols for NAN) were designed for low-power background discovery that may generate unnecessary delays for trigger-based applications. In addition, the low-power background discovery mechanisms in current NAN implementations do not necessarily consider and/or make use of OOB trigger schemes.

Figure 5:
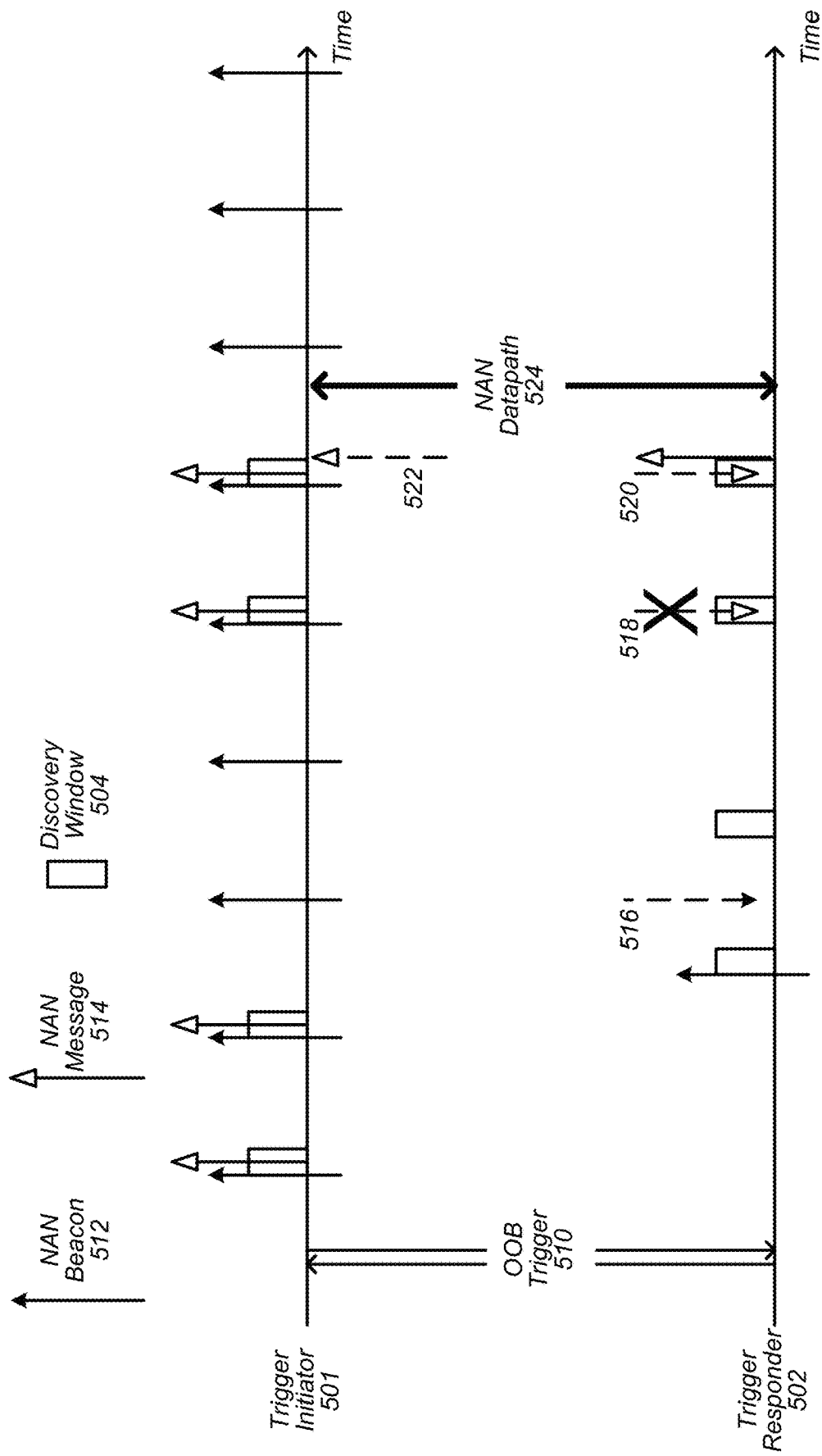
FIG. 5 illustrates an example of peer-to-peer service discovery after an OOB trigger, according to existing implementation.

For example, FIG. 5 illustrates an example of peer-to-peer service discovery after an OOB trigger, according to existing implementation. As shown, after an OOB trigger 510 for discovery, devices may not initially be in sync (or synchronized, e.g., to common discovery windows, such as discovery windows 504) and may miss one another's discovery windows after the OOB trigger (e.g., trigger responder 502 may miss NAN beacons 512 and NAN service/publish frames 514 from trigger initiator 501 and trigger initiator may miss NAN beacons 512 from trigger responder 502). As a further example, even if a device can capture (e.g., receive) a peer's discovery beacon (e.g., such as NAN beacon 516), the device may be required (e.g., due to current protocols) to wait until a subsequent discovery window to communicate with the peer device. Additionally, the device may still miss the peer's beacon and service discovery messages (e.g., such as missed service discovery message 518) during the discovery window due to channel congestion. In other words, there is not a guarantee that the device and peer device will be able to begin communications during the subsequent discovery window and may be required to wait until another discovery window to begin communications. In addition, after the NAN service discovery is completed successfully (e.g., such as exchanged service discovery messages 520 and 522), more delays may be introduced by data transfer (e.g., for NAN datapath 524), due to a duration of common resource blocks, duty cycles, and/or channel conditions.

Note further that current NAN discovery protocol implementations only enable either unsolicited publish/passive subscribe or active subscribe/solicited publish. In an unsolicited publish/passive subscribe scenario, a publisher may broadcast publish messages in discovery windows and a subscriber may scan for the publish messages in the discovery windows without transmitting any subscribe messages. In an active subscribe/solicited publish scenario, a subscriber may broadcast subscribe messages in discovery windows and a publisher may scan for the subscribe messages in the discovery windows and, if there is a service match, the publisher may respond to the subscriber with a publish message. However, for either case, if a device misses the peer device's unsolicited publish or active subscribe message, the devices may have to wait until a next discovery window to continue the service discovery, leading to delays as described above. Further, the delays may worsen if discovery windows become congested and devices do not have a chance to send out service discovery messages due to the congestion in the discovery windows.

Figure 6:
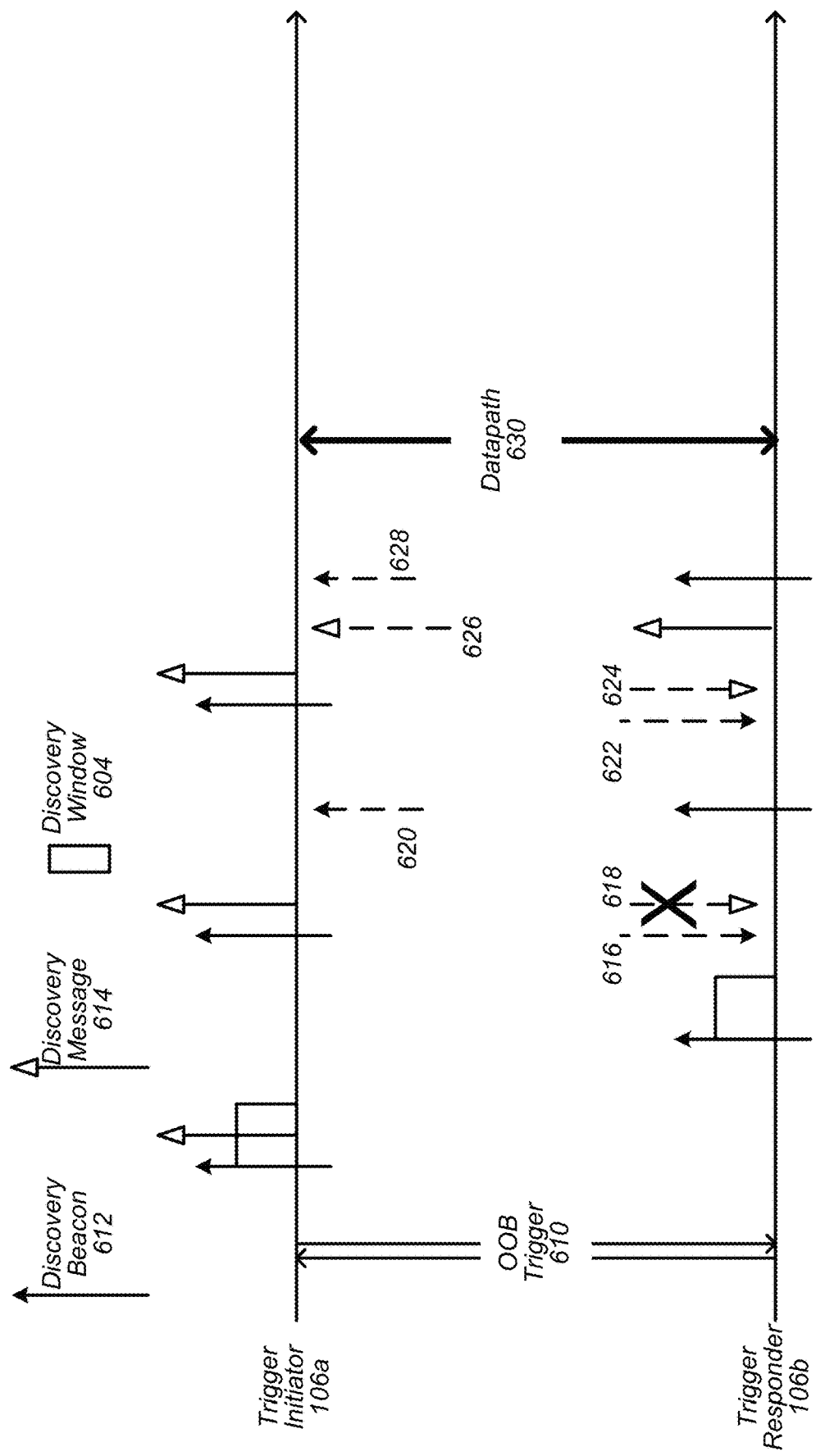
FIGS. 6-9 illustrate examples of accelerated peer-to-peer service discovery after an OOB trigger, according to embodiments.

In some embodiments, service discovery operations (e.g., NAN service discovery operations) may be extended outside of discovery windows for trigger-based applications. In some embodiments, extending service discovery operations outside of discovery windows may accelerate service discovery and/or datapath establishment, e.g., as illustrated by FIG. 6. In some embodiments, after triggering (e.g., an OOB triggering event or OOB trigger 610), both devices (e.g., a trigger initiator 106a and/or trigger responder 106b) may transmit discovery beacons 612 immediately or substantially immediately after triggering (e.g., after OOB trigger 610). In some embodiments, devices may disregard a role (e.g., master or non-master) and/or state (e.g., non-master sync or non-master non-sync) when transmitting discovery beacons 612. In some embodiments, service discovery messages 614, e.g., unsolicited publish messages and/or active subscribe messages, may be transmitted both inside (e.g., during) and outside (e.g., not during) discovery windows 604. In some embodiments, an unsolicited publish message and/or an active subscribe message may be transmitted outside of discovery windows with a similar or same frequency as transmitting discovery beacons, e.g., with a transmission internal between 50 and 200 time units (TUs), where a time unit may correspond to clock cycles of a common clock to which a device is synchronized. In some embodiments, a publisher/subscriber may transmit a discovery beacon and may transmit/broadcast unsolicited publish/active subscribe messages (substantially) immediately after transmission of the discovery beacon. As shown, at 616, a discovery beacon may be transmitted by trigger initiator 106a and may be received by trigger responder 106b, however, at 618, a discovery message, which may be transmitted by trigger initiator 106a outside of discovery windows, may be initially missed by trigger responder 106b. However, at 624, another discovery message may be transmitted by trigger initiator 106a outside of discovery windows and may be received by trigger responder 106b. At 626, a response discovery message may be transmitted by trigger responder 106b, also outside of discovery windows, and may be received by trigger initiator 106a. The message transmissions between the devices outside of discovery windows (e.g., at 616, 618, 620, 622, 624, 626, and 628) may lead to accelerated service discovery and quicker establishment of datapath 630, e.g., before a next discovery window.

Figure 7:
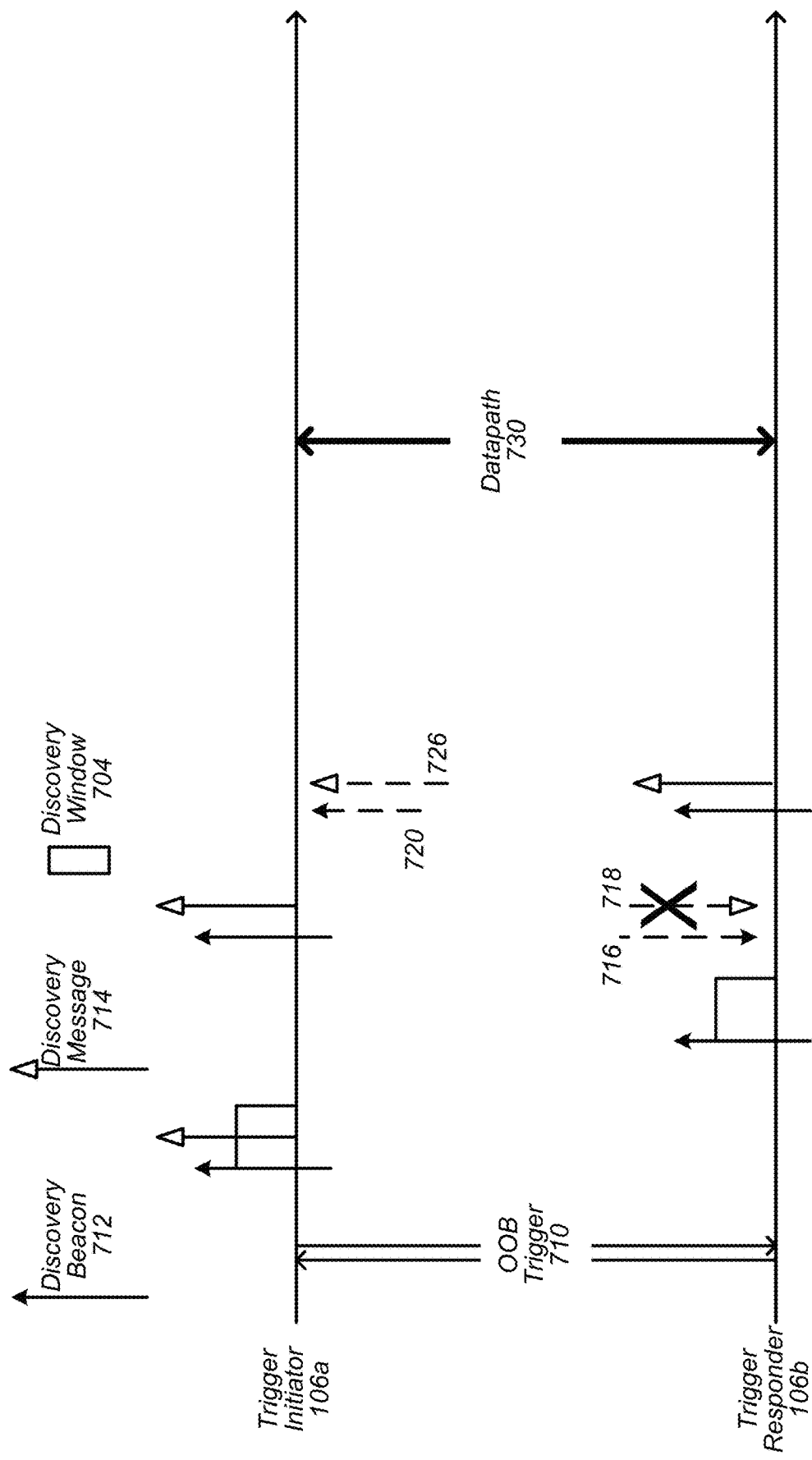

In some embodiments, such as the example embodiment illustrated by FIG. 7, a subscriber and/or a publisher may actively broadcast service discovery messages to further accelerate service discovery. In some embodiments, a publisher may operate as a multi-mode publisher and a subscriber may operate as a multi-mode subscriber. For example, a publisher may operate as both an unsolicited publisher and a solicited publisher. Thus, the publisher may broadcast unsolicited publish messages (e.g., discovery messages 714) periodically (e.g., as described above and/or outside of discovery windows 704) and/or the publisher may respond to received active subscribe messages if there are service matches. Similarly, a subscriber may operate as both an active subscriber and a passive subscriber. Thus, the subscriber may broadcast active subscribe messages (e.g., discovery messages 714) periodically (e.g., as described above) and/or the subscriber may report discovery results when either a broadcast or unicast publish message is received with matched services. In addition (or alternatively), discovery beacons 712 may be used to carry (transport) detailed unsolicited publish and active subscribe service information. For example, the service information may include a service descriptor attribute and a service descriptor extension attribute. The service information may be associated with a triggering application(s). In some embodiments, such a mechanism may save overhead to allow transmission of both discovery beacons and/or publish/subscribe messages together. As shown, after OOB trigger 710, both trigger initiator 106a and trigger responder 106b may both begin to transmit discovery beacons 712 and discovery messages 714. As shown, at 716, a discovery beacon may be received but at 718, a discovery message may be initially missed by trigger responder 106b. However, at 720 and 726, a discovery beacon and a discovery message transmitted by trigger responder 106b outside of discovery windows may be received by trigger initiator 106a, which may lead to accelerated service discovery and quicker establishment of datapath 730, e.g., before a next discovery window.

Figure 8:
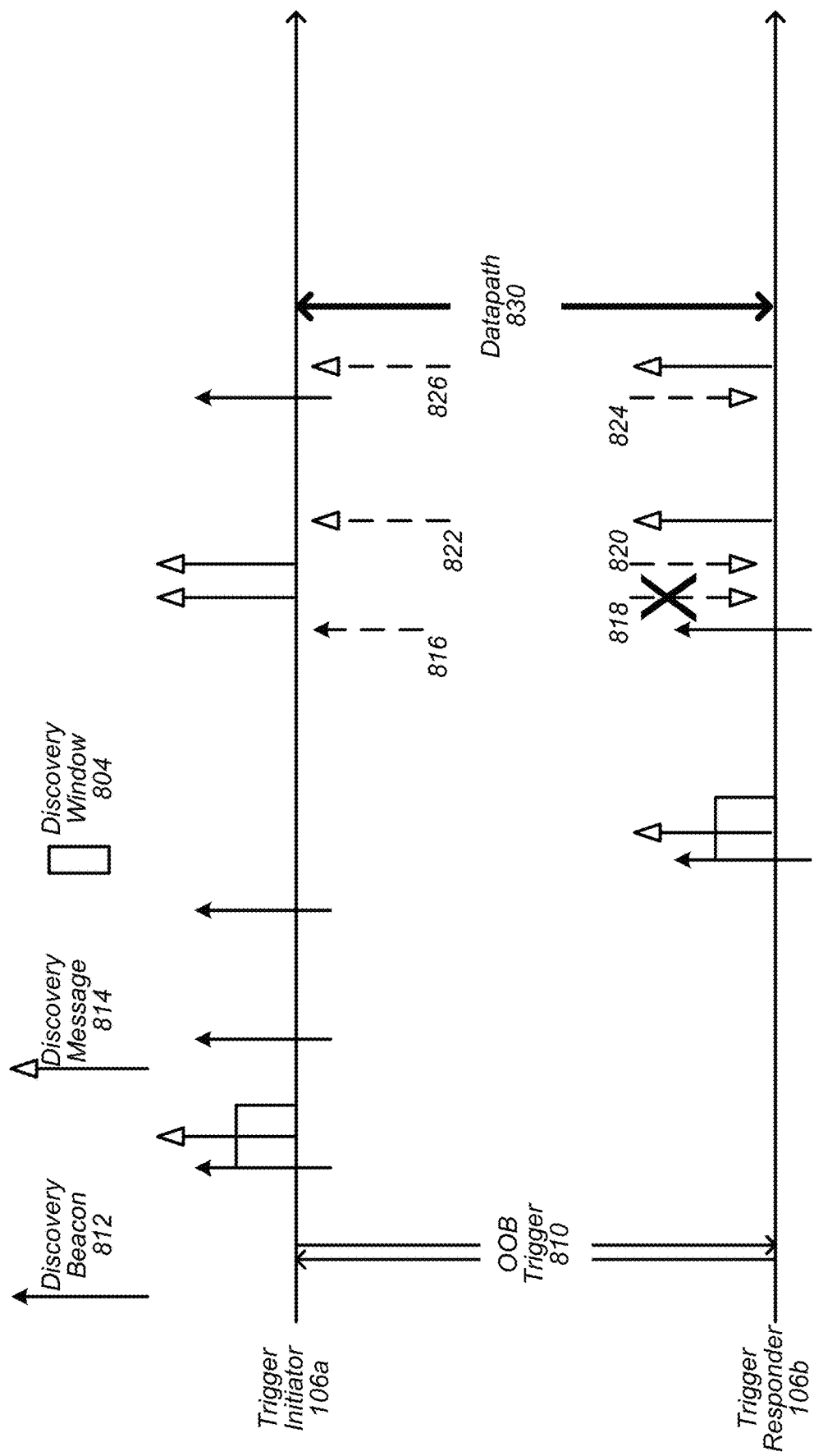

In some embodiments, e.g. as illustrated by FIG. 8, a device may (substantially) immediately transmit service discovery messages 814 (e.g., an unsolicited publish message and/or an active subscribe message) only after the device receives a discovery beacon 812 indicating (or with an indication of) a matched service(s) from a peer device. In some embodiments, the service discovery message may be transmitted regardless of discovery window 804 timing. In other words, the service discovery message may be transmitted at any time, either within or outside of discovery windows. In some embodiments, the device may unicast the service discovery message to the peer to ensure deliverability and may, in some embodiments, retransmit the service discovery message if a previous transmission of the service discovery message fails (e.g., not receiving an acknowledgement). As shown, after OOB trigger 810, trigger initiator 106a may begin to transmit discovery beacons 812 and discovery messages 814. As shown, at 816, a discovery beacon with a matched service may be transmitted by trigger responder 106b and may be received by trigger initiator 106a. In response, trigger initiator 106a may begin to transmit discovery messages to trigger responder 106b until an acknowledgement is received from trigger responder 106b. Thus, at 818, a discovery message may be initially missed by trigger responder 106b, however, at 820, a retransmitted discovery message may be received by trigger responder 106b and subsequent messages between the devices (e.g., at 822, 824, and 826) may lead to accelerated service discovery and quicker establishment of datapath 830, e.g., before a next discovery window.

Figure 9:
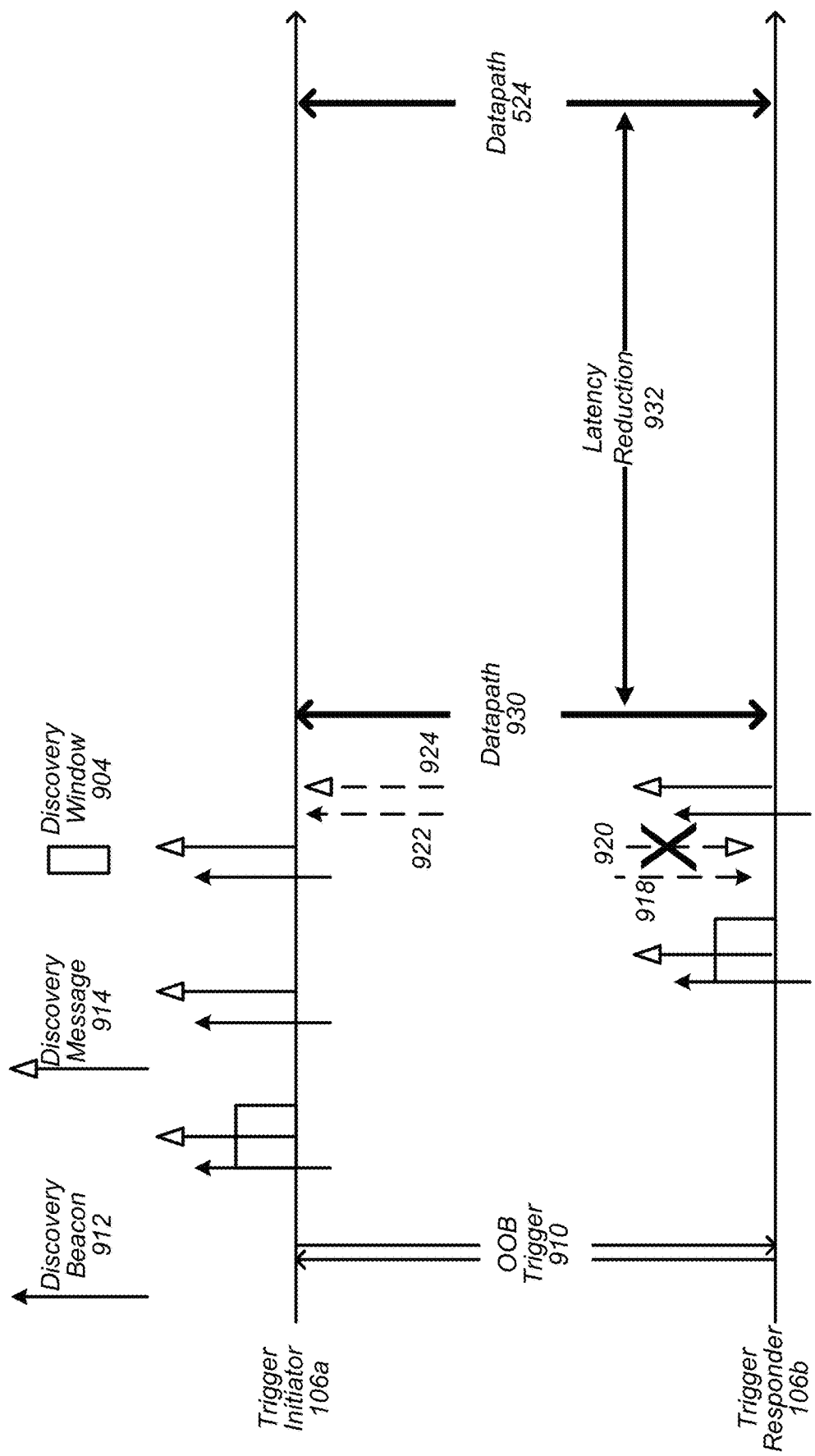

In some embodiments, e.g., as illustrated by FIG. 9, instant discovery mechanisms described herein may un-tie service discovery from discovery windows 904 thereby increasing opportunities for device to discover one another within a few hundred milliseconds after NAN interface activation. As illustrated by FIG. 9, devices may exchange discovery beacons 912 and discovery messages 914 (e.g., at 918, 920, 922, and 924) before a next discovery window, which may lead to a reduction (e.g., latency reduction 932) of at least 0.4 seconds in establishment of datapath 930 as compared to datapath 524 using prior art methods. In other words, enabling discovery outside of discovery windows may reduce a delay from an OOB trigger until datapath establishment by at least 0.4 seconds. Further, a total delay from the OOB trigger until the datapath establishment may be reduced to 0.2 seconds or less as a result of enabling discovery outside of discovery windows.

Trigger-Based Discovery Channel

In some implementations, NAN may define two discovery channels (e.g., per NAN 1.0), e.g., channel 6 for 2.4 GHz band and channel 149/44 for 5 GHz band. Note that 2.4 GHz only master devices may send NAN discovery beacons on channel 6 and may scan channel 6 continuously in order to capture peers' NAN beacons. Note further, that since channel 6 can become very congested and may also cause Wi-Fi/BT coexistence issues, 2.4/5 GHz dual-band devices may broadcast/transmit NAN discovery beacons on both channel 6 and channel 149/44. Further, dual-band devices may scan channel 6 and channel 149/44 alternatively to capture peers' NAN beacons. In some implementations, if a NAN device has other on-going Wi-Fi operations, such as infra connectivity and/or existing NAN datapaths, the device may predominately stay on a channel other than the NAN discovery channels and/or jump among multiple channels. However, if a device pair, after being triggered (e.g., via an OOB trigger as described above) and enabling NAN interfaces, are attempting to discover one another on different channels and/or on a (very) congested channel, significant delays may be caused for applications that may require instant communication.

Figure 10:
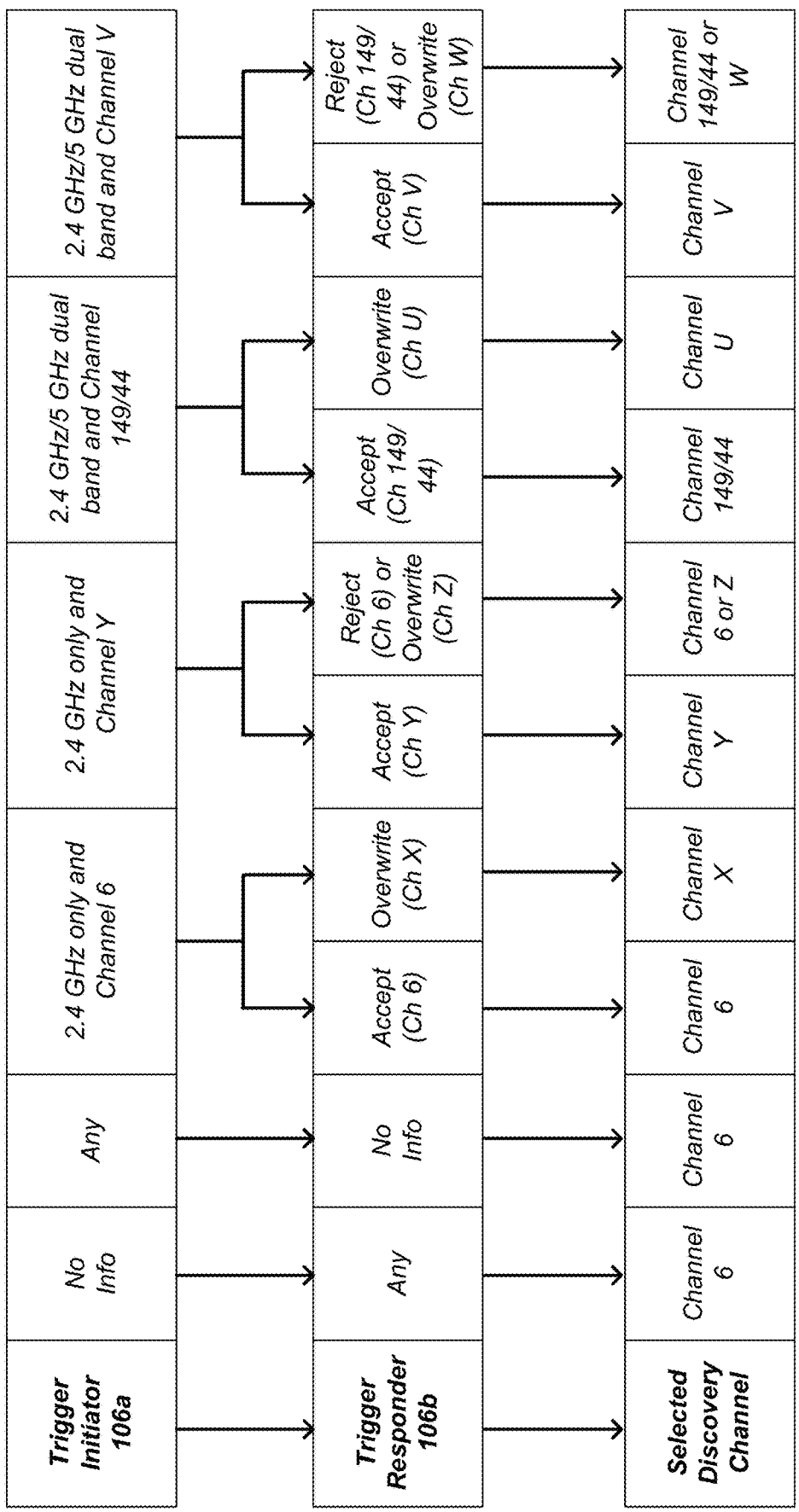
FIG. 10 illustrates an example of a channel selection strategy for service discovery, according to embodiments.

In some embodiments, when a device pair are triggered for instant communication, the devices may stay awake and try to discover each other on a common channel (and if possible, on a clean channel) until they establish the first NAN communication for service discovery. As illustrated by FIG. 10, a channel selection strategy may be based, at least in part, on information provided during a triggering operation. As shown, if either device (e.g., trigger initiator 106a or trigger responder 106b) does not provide information during the triggering operation, channel 6 may be used for service discovery. Further, if initiating device 106a only supports 2.4 GHz and provides channel 6, responding device 106b may select channel 6 or choose another 2.4 GHz channel (e.g., channel X). As another example, if initiating device 106a only supports 2.4 GHz and provides a channel other than channel 6 (e.g., channel Y), responding device 106b may select channel Y or choose another 2.4 GHz channel (e.g., channel 6 or Z). In some embodiments, if initiating device 106a supports dual band and provides channel 149/44, responding device 106b may select channel 149/44 or may choose another channel (e.g., channel U). As another example, if initiating device 106a supports dual band and provides channel V, responding device 106b may select channel V or may choose another channel (e.g., channel 149/44 or W).

In some embodiments, depending on trigger types, as well as integration/interaction between trigger functions and/or NAN functions, a trigger operation may or may not provide information to aid in discovery channel selection. In some embodiments, a trigger initiator and/or a trigger responder may propose a channel other than a default NAN discovery channel due to one or more conditions, such as its concurrent operation limitations, its capability to assess a quality of a default NAN discovery channel(s) and desire to select a cleaner (e.g., less congested) channel, and/or being configured to use an alternative channel by a third device (e.g. a controller/configurator). In some embodiments, a trigger initiator may allow or disallow a trigger responder to overwrite the trigger initiator's channel selection proposal.

Figure 11:
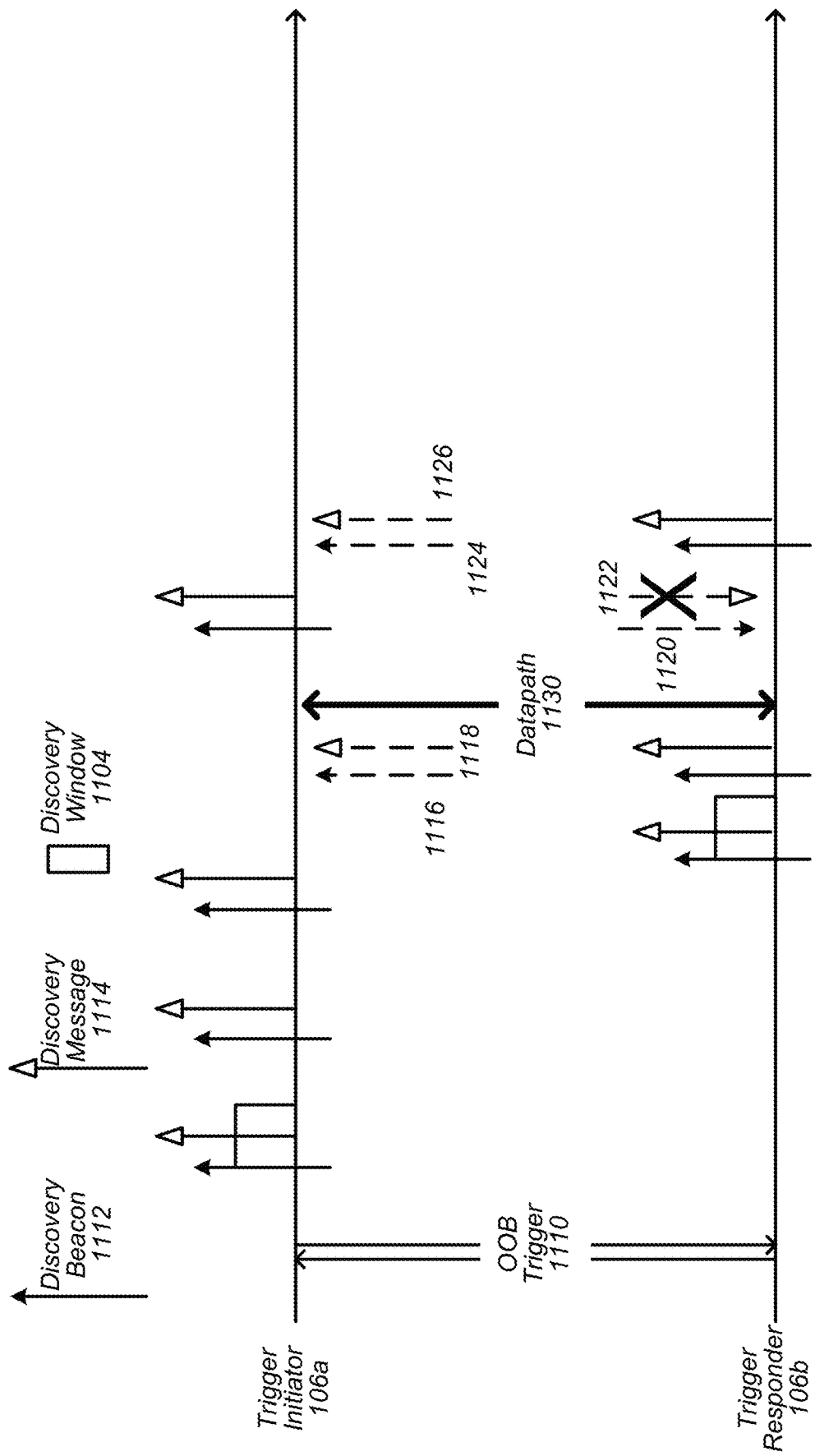
FIG. 11 illustrates another example of accelerated peer-to-peer service discovery after an OOB trigger, according to embodiments.

In some embodiments, as illustrated by FIG. 11, a device (e.g., trigger initiator 106a) may transmit discovery beacons 1112 and/or service discovery messages 1114 on a selected discovery channel substantially immediately after an OOB trigger 1110 event. As shown, in some embodiments, device may use a transmission interval between 50 and 200 TUs regardless of intervals between discovery windows 1104. In some embodiments, a device may transmit a discovery beacon 1116 and/or a service discovery message 1118 (substantially) immediately after switching to a selected discovery channel, e.g., instead of waiting for a transmission interval between 50 and 200 TUs. In some embodiments, such transmissions may further reduce discovery delays. In some embodiments, after triggering (e.g., OOB trigger 1110), a device pair (e.g., trigger initiator 106a and trigger responder 106b) may be continuously available on a selected discovery channel for more than 50% of a discovery window interval. For example, when a discovery window interval is 512 TUs, the device pair may be available on the selected discovery channel for at least 352 TUs. In some embodiments, the device pair may still be present on other channels, e.g. to maintain NAN 2.4 GHz discovery window operations, default NDC slots on 2.4 GHz band, and/or to maintain NAN/infra concurrent operations, however, the device pair may minimize the presence on those channels, at least until discovery has been completed. In some embodiments, the device pair may transmit (NAN) discovery beacons and/or service discovery messages (unsolicited publish and/or active subscribe) on a selected discovery channel with a transmission interval between 50 TU and 200 TU. Further, in some embodiments, the device pair, while staying on the selected discovery channel, may skip discovery beacon transmissions on other default NAN discovery channel(s), e.g., to avoid distraction. In some embodiments, the device pair may additionally (or alternatively) pause other unrelated operations and remain present on a selected discovery channel for all TU's until establishing a first communication for service discovery (e.g., messages exchanged at 1116, 1118) and/or until completion of the discovery process (e.g., establishment of datapath 1130 and messages exchanged at 1120, 1122, 1124, and 1126).

Figure 12:
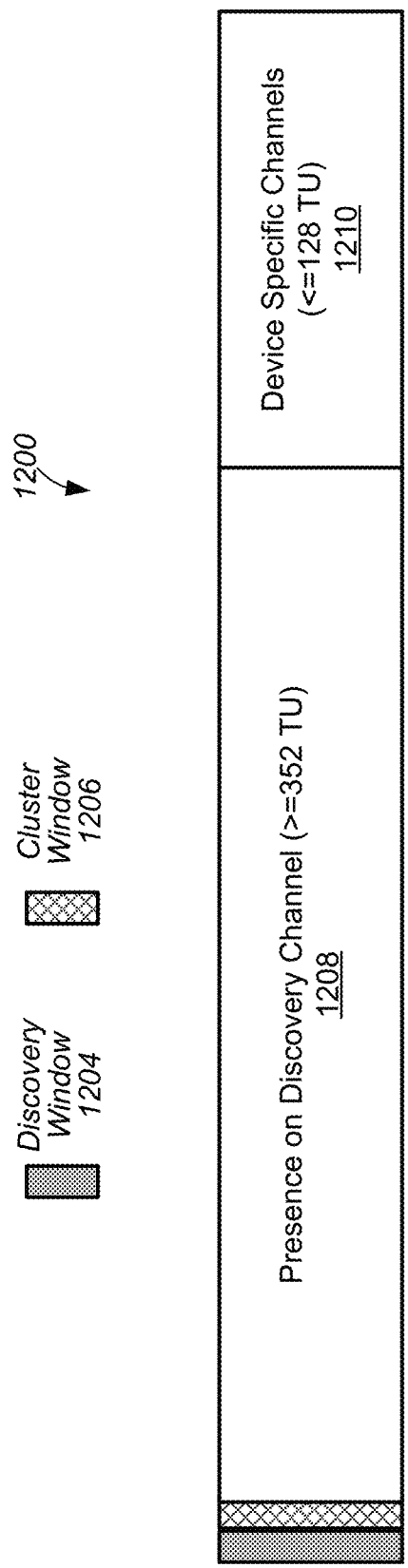
FIG. 12 illustrates an example of a discovery window interval schedule, according to some embodiments.

In some embodiments, once devices have discovered one another, e.g., post discovery, if either of the devices is capable of evaluating a selected discovery channel before and/or during triggered service discovery operations and determines the selected discovery channel is not a good channel for subsequent communications, a device may propose to establish a NAN datapath on a different/better channel during a data link schedule negotiation with a peer device. In other words, post discovery, if one of the devices determines that a selected discovery channel is not suitable for establishment of a datapath, the device may propose another channel during data link negotiations. In some embodiments, a device pair may establish a data link schedule (e.g., post discovery) by maintaining a presence on a selected discovery channel (e.g., for a majority of a discovery window interval) and additionally synchronizing their presences on the selected discovery channel, e.g., during each discovery window interval). For example, as illustrated by FIG. 12, a device pair may remain on a selected discovery channel for at least 352 TU (e.g., discovery channel presence 1208) during each discovery window interval 1200 (and synchronize timing for presence on the selected discovery channel). As shown by FIG. 12, a presence 1208 (e.g., a time period) on a selected discovery channel may be located in an early portion of each discovery window interval 1200, e.g., immediately after a 2.4 GHz discovery window 1204 and 2.4 GHz data cluster window 1206. In some embodiments, the devices may also synchronize their presences on additional operation channels (e.g., device specific channels 1210).

Figure 13:
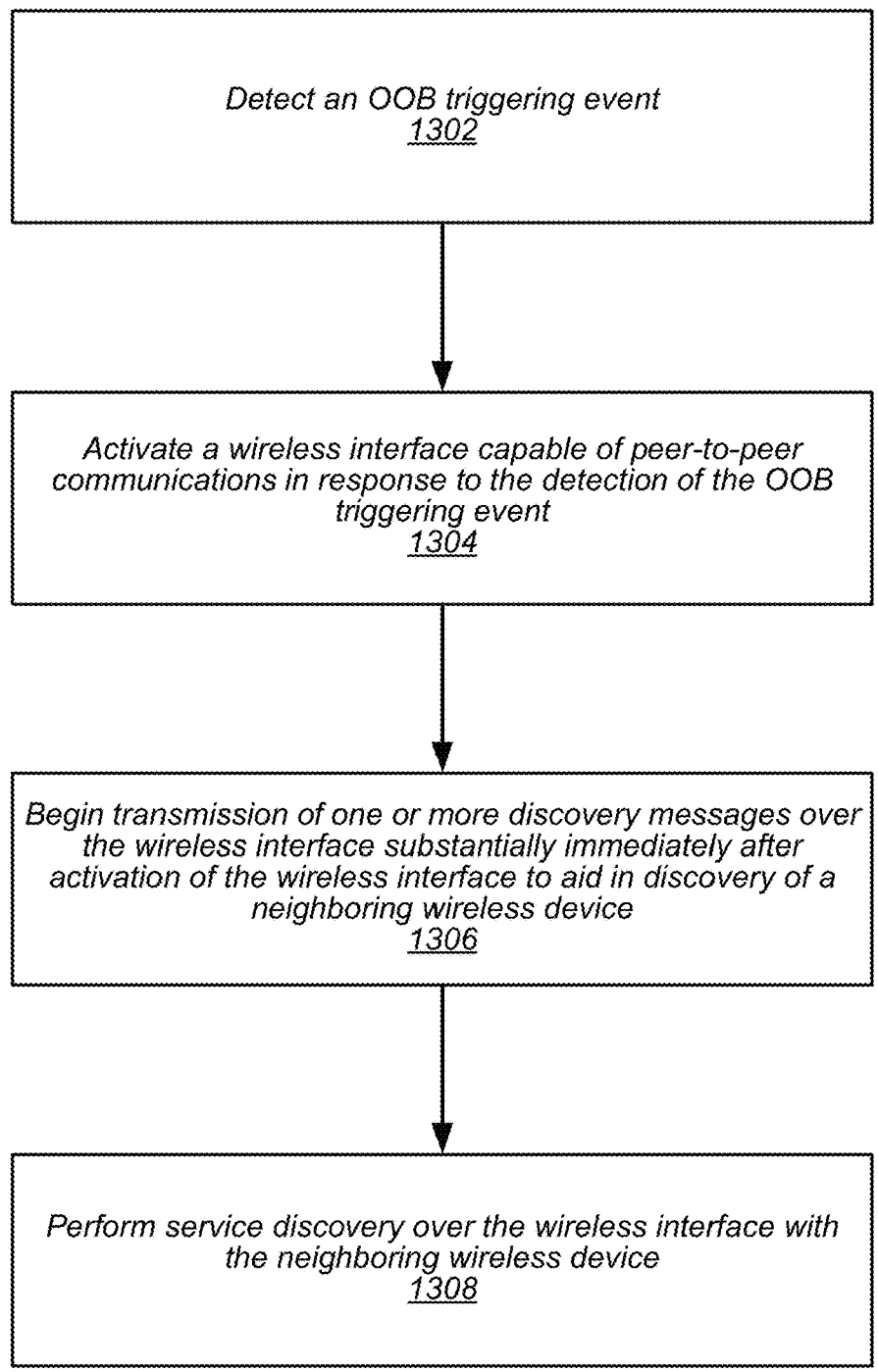
FIG. 13 illustrates a block diagram of an example of a method for of peer-to-peer service discovery after an OOB trigger, according to some embodiments.

FIG. 13 illustrates a block diagram of an example of a method for of peer-to-peer service discovery after an OOB trigger, according to some embodiments. The method shown in FIG. 13 may be used in conjunction with any of the systems or devices shown in the above Figures, among other devices. In various embodiments, some of the method elements shown may be performed concurrently, in a different order than shown, or may be omitted. Additional method elements may also be performed as desired. As shown, this method may operate as follows.

At 1302, an out-of-band (OOB) triggering event may be detected (e.g., by a wireless device, such as client station 106). In some embodiments, the wireless device may have a role of non-master non-sync. In some embodiments, the wireless device may operate as a multi-mode publisher. In some embodiments, the wireless device may operate as a multi-mode subscriber. In some embodiments, the out-of-band triggering event may include any of (or at least one of) a Bluetooth triggering event, a Bluetooth Low Energy trigger event, a near field communication trigger event, a quick response code triggering event, and/or a user initiated triggering event.

At 1304, in response to the detection of the OOB triggering event, a wireless interface capable of peer-to-peer communications may be activated.

At 1306, one or more discovery messages may be transmitted over the wireless interface substantially immediately after activation of the wireless interface to aid in discovery of a neighboring wireless device. Note that the phrase "substantially immediately" may refer to actions performed within a small timeframe after detection of the OOB triggering event such that the actions may be reasonably considered to be performed immediately after detection of the OOB triggering event. In some embodiments, the one or more discovery messages may include any, any combination of, and/or all of discovery beacons, an unsolicited publish message, and/or an active subscribe message. In some embodiments, the one or more discovery messages may be transmitted at an interval between 50 and 200 time units. In some embodiments, the one or more discovery messages may be transmitted both inside and outside of discovery windows.

At 1308, service discovery may be performed over the wireless interface with the neighboring wireless device. In some embodiments, at least one discovery message may be received from the neighboring wireless station and performance of the service discovery may responsive to receiving the at least one discovery message. In some embodiments, a service match may be determined based, at least in part, on the received at least one discovery message.

Figure 14:
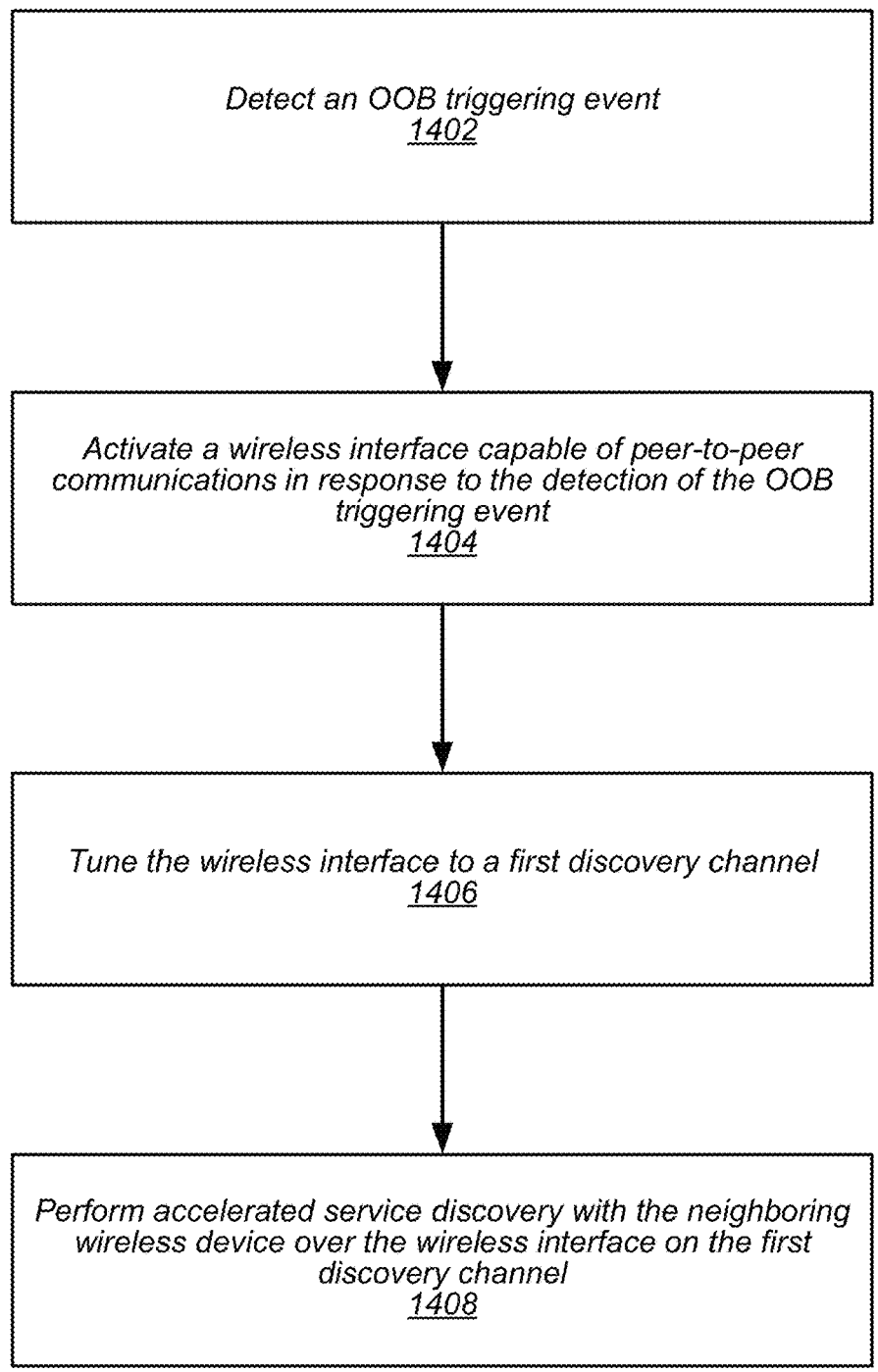
FIG. 14 illustrates a block diagram of an example of a method for using a discovery channel for peer-to-peer service discovery after an OOB trigger, according to some embodiments.

FIG. 14 illustrates a block diagram of an example of a method for using a discovery channel for peer-to-peer service discovery after an OOB trigger, according to some embodiments. The method shown in FIG. 14 may be used in conjunction with any of the systems or devices shown in the above Figures, among other devices. In various embodiments, some of the method elements shown may be performed concurrently, in a different order than shown, or may be omitted. Additional method elements may also be performed as desired. As shown, this method may operate as follows.

At 1402, an out-of-band (OOB) triggering event may be detected (e.g., by a wireless device, such as client station 106). In some embodiments, the wireless device may have a role of non-master non-sync. In some embodiments, the wireless device may operate as a multi-mode publisher. In some embodiments, the wireless device may operate as a multi-mode subscriber. In some embodiments, the out-of-band triggering event may include any of (or at least one of) a Bluetooth triggering event, a Bluetooth Low Energy trigger event, a near field communication trigger event, a quick response code triggering event, and/or a user initiated triggering event.

At 1404, in response to the detection of the OOB triggering event, a wireless interface capable of peer-to-peer communications may be activated.

At 1406, the wireless interface may be tuned to a first discovery channel. In some embodiments, the first discovery channel may be based, at least in part, on information exchanged during the OOB triggering event. In some embodiments, the first discovery channel may be proposed by one of the wireless device and the neighboring wireless device. In some embodiments, one of the wireless device or the neighboring wireless device may be a single band device and selection of the first discovery channel may be based, at least in part, on one of the devices being a single band device.

In some embodiments, the first discovery channel may be based, at least in part, on one or more conditions of the wireless device. In some embodiments, the one or more conditions may include any, any combination of, and/or all of concurrent operation limitations, capability to assess a quality of a default channel, desire to select a less congested channel as compared to a default or suggested channel, and/or being configured to use an alternative channel by another device.

At 1408, accelerated service discovery may be performed with the neighboring wireless device over the wireless interface on the first discovery channel. In some embodiments, at least one discovery message may be received from the neighboring wireless station and performance of the service discovery may responsive to receiving the at least one discovery message. In some embodiments, a service match may be determined based, at least in part, on the received at least one discovery message.

In some embodiments, the wireless device may be continuously available on the first discovery channel for at least half of a discovery window interval. In some embodiments, the first discovery channel and one or more additional discovery channels may be evaluated and one of the one or more additional discovery channels may be determined to be more suitable for a datapath than the first discovery channel. In such embodiments, service discovery may be switched from the first discovery channel to the additional discovery channel determined to be more suitable for the datapath.

It is well understood that the use of personally identifiable information should follow privacy policies and practices that are generally recognized as meeting or exceeding industry or governmental requirements for maintaining the privacy of users. In particular, personally identifiable information data should be managed and handled so as to minimize risks of unintentional or unauthorized access or use, and the nature of authorized use should be clearly indicated to users.

Embodiments of the present disclosure may be realized in any of various forms. For example, some embodiments may be realized as a computer-implemented method, a computer-readable memory medium, or a computer system. Other embodiments may be realized using one or more custom-designed hardware devices such as ASICs. Other embodiments may be realized using one or more programmable hardware elements such as FPGAs.

In some embodiments, a non-transitory computer-readable memory medium may be configured so that it stores program instructions and/or data, where the program instructions, if executed by a computer system, cause the computer system to perform a method, e.g., any of the method embodiments described herein, or, any combination of the method embodiments described herein, or, any subset of any of the method embodiments described herein, or, any combination of such subsets.

In some embodiments, a wireless device (or wireless station) may be configured to include a processor (or a set of processors) and a memory medium, where the memory medium stores program instructions, where the processor is configured to read and execute the program instructions from the memory medium, where the program instructions are executable to cause the wireless device to implement any of the various method embodiments described herein (or, any combination of the method embodiments described herein, or, any subset of any of the method embodiments described herein, or, any combination of such subsets). The device may be realized in any of various forms.

Although the embodiments above have been described in considerable detail, numerous variations and modifications will become apparent to those skilled in the art once the above disclosure is fully appreciated. It is intended that the following claims be interpreted to embrace all such variations and modifications.

What is claimed is:

1. A wireless device, comprising:
   at least one antenna;
   at least one radio communicatively coupled to the antenna and configured to perform wireless communications according to at least one radio access technology (RAT);
   at least one processor communicatively coupled to the at least one radio, wherein the wireless device is configured to perform voice and/or data communications;
   wherein the at least one processor is configured to cause the wireless device to:
      detect an out-of-band (OOB) triggering event;
      in response to the detection of the OOB triggering event, activate a wireless interface configured for peer-to-peer communications;
      transmit one or more discovery messages over the wireless interface substantially immediately after activation of the wireless interface to aid in discovery of a neighboring wireless device; and
      perform service discovery over the wireless interface with the neighboring wireless device.

2. The wireless device of claim 1,
   wherein the out-of-band triggering event comprises at least one of:
      a Bluetooth triggering event;
      a Bluetooth Low Energy trigger event;
      a near field communication trigger event;
      a quick response code triggering event; or
      a user initiated triggering event.

3. The wireless device of claim 1,
   wherein the one or more discovery messages comprise one or more of:
      discovery beacons;
      an unsolicited publish message; or
      an active subscribe message.

4. The wireless device of claim 1,
   wherein the one or more discovery messages are transmitted both inside and outside of discovery windows.

5. The wireless device of claim 1,
   wherein the wireless device operates as either a multi-mode publisher or a multi-mode subscriber.

6. The wireless device of claim 1,
   wherein the at least one processor is further configured to cause the wireless device to:
      tune the wireless interface to a first discovery channel, wherein the first discovery channel is based, at least in part, on information exchanged during the out-of-band triggering event, and wherein the one or more discovery messages are transmitted on the first discovery channel.

7. The wireless device of claim 6,
   wherein the first discovery channel is based, at least in part, on one or more conditions of the wireless device.

8. The wireless device of claim 7,
   wherein the one or more conditions comprise one or more of:
      concurrent operation limitations;
      capability to assess a quality of a default channel;
      desire to select a less congested channel as compared to a default or suggested channel; or
      being configured to use an alternative channel by another device.

9. The wireless device of claim 1,
   wherein the at least one processor is further configured to cause the wireless device to:
      receive, from the neighboring wireless station, at least one discovery message, wherein the performing the service discovery is responsive to the receiving; and
      determine a service match based, at least in part, on the received at least one discovery message.

10. An apparatus, comprising:
    a memory; and
    processing circuitry in communication with the memory, wherein the processing circuitry is configured to:
       detect an out-of-band (OOB) triggering event;
       in response to the detection of the OOB triggering event, activate a wireless interface configured for peer-to-peer communications;
       generate instructions to tune the wireless interface to a first discovery channel, wherein the first discovery channel is based, at least in part, on information exchanged during the out-of-band triggering event;
       generate instructions to transmit one or more discovery messages over the wireless interface on the first discovery channel substantially immediately after activation of the wireless interface to aid in discovery of a neighboring wireless device; and
       generate instructions to perform accelerated service discovery over the wireless interface with the neighboring wireless device.

11. The apparatus of claim 10,
    wherein the first discovery channel is proposed by one of the apparatus and the neighboring wireless device.

12. The apparatus of claim 10,
    wherein one of the wireless interface or the neighboring wireless device is configured to operate in a single band, wherein selection of the first discovery channel is based, at least in part, on the single band operation.

13. The apparatus of claim 10,
    wherein the out-of-band triggering event comprises at least one of:
       a Bluetooth triggering event;
       a Bluetooth Low Energy trigger event;
       a near field communication trigger event;
       a quick response code triggering event; or
       a user initiated triggering event.

14. The apparatus of claim 10,
    wherein the one or more discovery messages comprise one or more of:
       discovery beacons;
       an unsolicited publish message; or
       an active subscribe message.

15. The apparatus of claim 10,
    wherein transmission of the one or more discovery messages occurs outside of discovery windows.

16. A non-transitory computer readable memory medium storing program instructions executable by processing circuitry of a wireless device to:
    detect an out-of-band (OOB) triggering event, wherein detection of the OOB triggering event includes exchange of information associated with a first discovery channel;
    in response to the detection of the OOB triggering event, activate a wireless interface configured for peer-to-peer communications, wherein activation of the wireless interface includes tuning the wireless interface to the first discovery channel;

transmit one or more discovery messages over the wireless interface on the first discovery channel substantially immediately after activation of the wireless interface to aid in discovery of a neighboring wireless device; and perform accelerated service discovery over the wireless interface with the neighboring wireless device.

17. The non-transitory computer readable memory medium of claim 16, wherein the wireless device operates as either a multi-mode publisher or a multi-mode subscriber.

18. The non-transitory computer readable memory medium of claim 16, wherein the wireless device is continuously available on the first discovery channel for at least half of a discovery window interval.

19. The non-transitory computer readable memory medium of claim 16, wherein the program instructions are further executable to:

evaluate the first discovery channel and one or more additional discovery channels; and determine that one of the one or more additional discovery channels is more suitable for a datapath than the first discovery channel.

20. The non-transitory computer readable memory medium of claim 16, wherein the one or more discovery messages are transmitted both inside and outside of discovery windows.

* * * * *